(12) United States Patent
Cheng et al.

(10) Patent No.: US 12,104,101 B2
(45) Date of Patent: Oct. 1, 2024

(54) COMPOSITE MATERIALS

(71) Applicant: President and Fellows of Harvard College, Cambridge, MA (US)

(72) Inventors: Sibo Cheng, Cambridge, MA (US); Yashraj S. Narang, Cambridge, MA (US); Canhui Yang, Somerville, MA (US); Zhigang Suo, Lexington, MA (US); Robert D. Howe, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1132 days.

(21) Appl. No.: 16/872,088

(22) Filed: May 11, 2020

(65) Prior Publication Data

US 2020/0354613 A1    Nov. 12, 2020

Related U.S. Application Data

(60) Provisional application No. 62/846,231, filed on May 10, 2019.

(51) Int. Cl.
  *B32B 5/18* (2006.01)
  *B32B 5/32* (2006.01)
  (Continued)

(52) U.S. Cl.
  CPC ............... *C09J 7/385* (2018.01); *B32B 5/18* (2013.01); *B32B 5/32* (2013.01); *B32B 25/045* (2013.01);
  (Continued)

(58) Field of Classification Search
  CPC .. C09J 7/385; C09J 2301/414; C09J 2433/00; C09J 2483/006; B32B 5/18; B32B 5/32;
  (Continued)

(56) References Cited

U.S. PATENT DOCUMENTS

| | | | | |
|---|---|---|---|---|
| 3,566,874 A | * | 3/1971 | Shepherd | A61M 25/0009 |
| | | | | 424/422 |
| 4,337,111 A | * | 6/1982 | Kauffman | C08J 5/124 |
| | | | | 428/420 |

(Continued)

FOREIGN PATENT DOCUMENTS

WO    WO-2019/203974    10/2019

OTHER PUBLICATIONS

Acome et al., "Hydraulically amplified self-healing electrostatic actuators with muscle-like performance," Science, vol. 359, Issue 6371, Jan. 5, 2018, pp. 61-65.

(Continued)

*Primary Examiner* — John D Freeman
(74) *Attorney, Agent, or Firm* — Wilmer Cutler Pickering Hale and Dorr LLP

(57) ABSTRACT

A composite material is disclosed including: a first material including a plurality of crosslinked first polymer chains including a plurality of first polymer monomeric units; a coating layer on the surface of the first material, wherein the coating layer includes a plurality of adhesion polymer chains, wherein the plurality of adhesion polymer chains includes a plurality of the first polymer monomeric units and a plurality of first bond-forming units, wherein the adhesion polymer chains are interwoven with the first polymer chains; and a second material including a plurality of second polymer chains, wherein the coating layer is disposed in-between the first and the second material and contacting the surface of the first and the second material, and a portion of the second polymer chains includes a plurality of second polymer monomeric units and second bond-forming units; wherein the first and the second bond-forming units form one or more bonds.

8 Claims, 35 Drawing Sheets

(51) Int. Cl.
   B32B 7/12      (2006.01)
   B32B 25/04     (2006.01)
   B32B 25/16     (2006.01)
   B32B 25/20     (2006.01)
   C09J 7/38      (2018.01)
(52) U.S. Cl.
   CPC .............. *B32B 25/16* (2013.01); *B32B 25/20* (2013.01); *B32B 7/12* (2013.01); *B32B 2250/24* (2013.01); *B32B 2255/26* (2013.01); *B32B 2266/122* (2016.11); *B32B 2457/00* (2013.01); *C09J 2301/414* (2020.08); *C09J 2433/00* (2013.01); *C09J 2483/006* (2013.01)
(58) Field of Classification Search
   CPC ... B32B 7/12; B32B 2266/122; B32B 25/045; B32B 25/16; B32B 25/20; B32B 2250/24; B32B 2255/26; B32B 2457/00
   See application file for complete search history.

(56)              References Cited

U.S. PATENT DOCUMENTS

2011/0166248 A1*  7/2011  Hsu .......................... C08F 8/00
                                                      526/260
2017/0307778 A1* 10/2017  Tran ................. B29D 11/00134

OTHER PUBLICATIONS

Bai et al., "Transparent hydrogel with enhanced water retention capacity by introducing highly hydratable salt," Applied Physics Letters, vol. 105, Issue 15, Oct. 14, 2014, 6 total pages.
Bard et al., "Electrochemical Methods: Fundamentals and Applications," Second Edition, John Wiley & Sons, New York, Dec. 18, 2000. 850 pages.
Bartlett et al., "A 3D-printed, functionally graded soft robot powered by combustion," Science, vol. 349, Issue 6244, Jul. 10, 2015, pp. 161-165 (6 pages).
Bilodeau et al., "Monolithic fabrication of sensors and actuators in a soft robotic gripper," 2015 IEEE/RSJ International Conference on Intelligent Robots and Systems (IROS), Sep. 28-Oct. 2, 2015, pp. 2324-2329.
Carpi et al., "Stretching Dielectric Elastomer Performance," Science, Dec. 24, 2010, vol. 330, Issue 6012, pp. 1759-1761.
Chen et al., "Stretchable and transparent hydrogels as soft conductors for dielectric elastomer actuators," Journal of Polymer Science Part B Polymer Physics, vol. 52, Issue 16, Aug. 15, 2014, pp. 1055-1060.
Chossat et al., "A Soft Strain Sensor Based on Ionic and Metal Liquids," IEEE Sensors Journal, vol. 13, No. 9, Sep. 2013, pp. 3405-3414 (11 pages).
Chun et al., "Iontronics," Annual Review of Analytical Chemistry, vol. 8, published online Jun. 5, 2015, pp. 441-462.
Cianchetti et al., "Bioinspired locomotion and grasping in water: the soft eight-arm Octopus robot," Bioinspiration & Biomimetics, May 13, 2015, vol. 10(035003). 20 pages.
Frutiger et al., "Capacitive Soft Strain Sensors via Multicore-Shell Fiber Printing," Advanced Materials, vol. 27, Issue 15, Apr. 17, 2015, pp. 2440-2446.
Geddes, "Historical evolution of circuit models for the electrode-electrolyte interface," Annals of Biomedical Engineering, Jan. 1997, vol. 25, pp. 1-14.
Guo et al., "Highly Stretchable, Strain Sensing Hydrogel Optical Fibers," Advanced Materials, vol. 28, Issue 46, Dec. 14, 2016, pp. 10244-10249.
Huang et al., "Pattern formation in plastic liquid films on elastomers by ratcheting," Soft Matter, vol. 12, Issue 16, Mar. 21, 2016, pp. 3820-3827.
Ilievski et al., "Soft Robotics for Chemists," Angewandte Chemie International Edition, vol. 50, Issue 8, Feb. 18, 2011, pp. 1890-1895.
Jin et al., "Microstructural origin of resistance-strain hysteresis in carbon nanotube thin film conductors," Proceedings of the National Academy of Sciences of the United States of America, Feb. 27, 2018, vol. 115, No. 9, pp. 1986-1991 (7 pages).
Katzschmann et al., "Hydraulic Autonomous Soft Robotic Fish for 3D Swimming," Experimental Robotics, Springer Tracts in Advanced Robotics (2016), vol. 109, pp. 405-450, first online Nov. 13, 2015. 15 pages.
Keplinger et al., "Stretchable, Transparent, Ionic Conductors," Science, vol. 341, Issue 6149, Aug. 30, 2013, pp. 984-987.
Kim et al., "Designing Responsive Buckled Surfaces by Halftone Gel Lithography," Science, vol. 335, Issue 6073, Mar. 9, 2012, pp. 1201-1205.
Larson et al., "Highly stretchable electroluminescent skin for optical signaling and tactile sensing," Science, Mar. 4, 2016, vol. 351(6277), pp. 1071-1074.
Laschi et al., "Soft Robot Arm Inspired by the Octopus," Advanced Robotics, published online Apr. 13, 2012, vol. 26, Issue 7, pp. 709-727.
Le Floch et al., "Wearable and Washable Conductors for Active Textiles," ACS Applied Materials & Interfaces, Jul. 11, 2017, vol. 9(30), pp. 25542-25552.
Lee et al., ""Cut and Stick" Rubbery Ion Gels as High Capacitance Gate Dielectrics," Advanced Materials, vol. 24, Issue 32, Aug. 22, 2012, pp. 4457-4462.
Li et al., "Fast-moving soft electronic fish," Science Advances, vol. 3, No. 4, Apr. 5, 2017, pp. 1-7 (8 pages).
Liu et al., "Bonding dissimilar polymer networks in various manufacturing processes, " Nature Communications, vol. 9, Feb. 27, 2018, pp. 1-11.
Lu et al., "Bioinspired bicipital muscle with fiber-constrained dielectric elastomer actuator," Extreme Mechanics Letters, vol. 6, Mar. 2016, pp. 75-81.
Ma et al., "Thermally Responsive Hydrogel Blends: A General Drug Carrier Model for Controlled Drug Release," Angewandte Chemie International Edition, vol. 54, issue 25, Jun. 15, 2015, pp. 7376-7380.
Marchese et al., "Autonomous Soft Robotic Fish Capable of Escape Maneuvers Using Fluidic Elastomer Actuators," Soft Robotics, vol. 1, No. 1, Feb. 21, 2014, pp. 75-87.
Morelle et al., "Localized Deformation in Plastic Liquids on Elastomers," Journal of Applied Mechanics, vol. 84:101002, Oct. 2017. 5 pages.
Mosadegh et al., "Pneumatic Networks for Soft Robotics that Actuate Rapidly," Advanced Functional Materials, vol. 24, Jan. 10, 2014, pp. 2163-2170.
Muth et al., "Embedded 3D Printing of Strain Sensors within Highly Stretchable Elastomers," Advanced Materials, vol. 26, Issue 36, Sep. 24, 2014, pp. 6307-6312.
Needleman, "Inflation of spherical rubber balloons," International Journal of Solids and Structures (1977), vol. 13, Issue 5, pp. 409-421.
Osada et al., "A polymer gel with electrically driven motility," Nature, vol. 355, Issue 6357, Jan. 16, 1992, pp. 242-244.
Park et al., "Design and Fabrication of Soft Artificial Skin Using Embedded Microchannels and Liquid Conductors," IEEE Sensors Journal, vol. 12, No. 8, Aug. 2012, pp. 2711-2718.
Park et al., "Phototactic guidance of a tissue-engineered soft-robotic ray," Science, vol. 353, Issue 6295, Jul. 8, 2016, pp. 158-162 (6 pages).
Park et al., "Therapeutic-Gas-Responsive Hydrogel," Advanced Materials, vol. 29 (1702859), published online Oct. 11, 2017. 8 pages.
Plueddemann, "Chemistry of Silane Coupling Agents: Chapter 2 Introduction," Silane Coupling Agents, Springer, New York, NY, 1991, p. 31-32.
Rafsanjani et al., "Kirigami skins make a simple soft actuator crawl," Science Robotics, vol. 3, Feb. 21, 2018, pp. 1-7 (35 pages).
Randles, "Kinetics of rapid electrode reactions," Discussions of the Faraday Society (1947), vol. 1, pp. 11-19.
Robinson et al, "Integrated soft sensors and elastomeric actuators for tactile machines with kinesthetic sense," Extreme Mechanics Letters, available online Sep. 25, 2015, vol. 5, pp. 47-53.

(56) References Cited

OTHER PUBLICATIONS

Roche et al., "Soft robotic sleeve supports heart function," Science Translation Medicine, Jan. 18, 2017, vol. 9, eaaf3925. 11 pages.

Rothemund et al., "A soft, bistable valve for autonomous control of soft actuators," Science Robotics, vol. 3, Issue 16, Mar. 21, 2018, pp. 1-10 (11 pages).

Shay et al., "Soft electrodes combining hydrogel and liquid metal," Soft Matter, May 2018, vol. 14, Issue 17, pp. 3296-3303.

Shepherd et al, "Soft Machines That are Resistant to Puncture and That Self Seal," Advanced Materials, vol. 25, Issue 46, Dec. 10, 2013, pp. 6709-6713.

Shivapooja et al., "Bioinspired Surfaces with Dynamic Topography for Active Control of Biofouling," Advanced Materials, Mar. 13, 2013, vol. 25, Issue 10, pp. 1430-1434.

Stokes et al., "Ionic Hydration and Activity in Electrolyte Solutions," Journal of the American Chemical Society, May 1, 1948, vol. 70, pp. 1870-1878.

Sun et al., "Ionic skin," Advanced Materials, vol. 26, Issue 45, Oct. 29, 2014, pp. 7608-7614.

Sun et al., "Multistimuli-Responsive, Moldable Supramolecular Hydrogels Cross-Linked by Ultrafast Complexation of Metal Ions and Biopolymers," Angewandte Chemie International Edition, vol. 54, Issue 27, Jun. 26, 2015, pp. 7944-7948.

Tondu et al., "A Seven-degrees-of-freedom Robot-arm Driven by Pneumatic Artificial Muscles for Humanoid Robots," The International Journal of Robotics Research, vol. 24, Issue 4, Apr. 2005, pp. 257-274 (19 pages).

Truby et al., "Soft Somatosensitive Actuators via Embedded 3D Printing," Advanced Materials, vol. 30, Issue 15, Apr. 12, 2018, 8 pages.

Wehner et al. "An integrated design and fabrication strategy for entirely soft, autonomous robots," Nature, Aug. 25, 2016, vol. 536, pp. 451-455 (16 pages).

Wilson, "Sensor Technology Handbook," Newnes an imprint of Elsevier, Elsevier Amsterdam, Dec. 22, 2004, 703 pages.

Wirthl et al., "Instant tough bonding of hydrogels for soft machines and electronics," Science Advances, vol. 3, No. 6, Jun. 21, 2017. 10 pages.

Witucki, "A Silane Primer: Chemistry and the Applications of Alkoxy Silanes," Journal of Coatings Technology, Jul. 1993, vol. 65, No. 822, pp. 57-60.

Wurdemann et al., "Embedded electro-conductive yarn for shape sensing of soft robotic manipulators," presented at the 37th Annual International Conference of the IEEE Engineering in Medicine and Biology Society (EMBC), Aug. 25-29, 2015, pp. 8026-8029.

Yang et al., "Electroluminescence of Giant Stretchability," Advanced Materials, vol. 28, Issue 22, Jun. 8, 2016, pp. 4480-4484.

Yang et al., "Hydrogel ionotronics," Nature Reviews Materials, vol. 3, Jun. 2018, pp. 125-142.

Yang et al., "Ionic cable," Extreme Mechanics Letters, vol. 3, Mar. 17, 2015, pp. 59-65.

Yeo et al., "Flexible and Stretchable Strain Sensing Actuator for Wearable Soft Robotic Applications," Advanced Materials Technologies, vol. 1, Issue 3, Jun. 2016. 10 pages.

Yuk et al., "Hydraulic hydrogel actuators and robots optically and sonically camouflaged in water," Nature Communications, 8:14230, Feb. 1, 2017, pp. 1-12.

Yuk et al., "Skin-inspired hydrogel-elastomer hybrids with robust interfaces and functional microstructures," Nature Communications, vol. 7, Jun. 27, 2016, pp. 1-11.

\* cited by examiner

COMPOSITE MATERIALS

CROSS REFERENCE TO RELATED APPLICATION

This application claims priority to and the benefit of U.S. Provisional Application No. 62/846,231, filed May 10, 2019, the contents of which are hereby incorporated by reference. All patents, patent applications and publications cited herein are hereby incorporated by reference in their entirety in order to more fully describe the state of the art as known to those skilled therein as of the date of the invention described herein.

STATEMENT REGARDING FEDERALLY SPONSORED RESEARCH OR DEVELOPMENT

The invention was made with U.S. Government support under grant nos. CMMI-1637838, awarded by NSF National Robotics Initiative, DGE-1122374, awarded by NSF Graduate Research Fellowship Award, DMR 14-20570, awarded by NSF MRSEC, and CMMI-1404653, awarded by NSF. The Government has certain rights in the invention.

FIELD OF THE INVENTION

The present disclosure relates to polymeric materials. More particularly, the present disclosure relates to polymeric materials useful as adhesion materials.

SUMMARY

In one aspect, a composite material includes:
a first material including a plurality of crosslinked first polymer chains including a plurality of first polymer monomeric units;
a coating layer on at least a portion of the surface of the first material, wherein the coating layer includes a plurality of adhesion polymer chains, wherein said plurality of adhesion polymer chains includes a plurality of the first polymer monomeric units and a plurality of first bond-forming units, wherein the adhesion polymer chains are interwoven with the crosslinked first polymer chains; and
a second material including a plurality of second polymer chains on at least a surface of the second material, wherein the coating layer is disposed in-between the first material and the second material and contacting the surface of the first material and the second material, and at least a portion of each of the second polymer chains includes a plurality of second polymer monomeric units and second bond-forming units;
wherein the first bond-forming units and the second bond-forming units form one or more bonds.

In any one or more of the embodiments described herein, the adhesion polymer chains are not covalently bonded to the first polymer chains.

In any one or more of the embodiments described herein, the first material and the second material are each independently selected from the group consisting of a hydrogel, an ionogel, an elastomer, and a biological polymer.

In any one or more of the embodiments described herein, the first material or the second material includes a hydrogel.

In any one or more of the embodiments described herein, the first polymer monomeric units and the second polymer monomeric units are each independently selected from the group consisting of the monomeric units of poly(hydroxyethylmethacrylate) (PHEMA), poly(acrylamide) (PAAM), poly(dimethylacrylamide) (PDMA), poly(N-isopropylacrylamide) (PNIPAM), sodium polyacrylate (NaPAA), poly(acrylic acid) (PAAc), poly(lactic-co-glycolic acid) (PLGA), poly(ethylene glycol) (PEG), poly(ethylene glycol) diacrylate (PEGDA), poly(ethylene glycol) methacrylate (PEGMA), poly(ethylene glycol) dimethacrylate (PEGDMA) alginate, chitosan, and a combination thereof.

In any one or more of the embodiments described herein, the first material or the second material includes an elastomer.

In any one or more of the embodiments described herein, the first polymer monomeric units and the second polymer monomeric units are each independently selected from the group consisting of the monomeric units of styrene butadiene rubber, polybutadiene rubber, silicone rubber, polyurethane, and a combination thereof.

In any one or more of the embodiments described herein, the silicone rubber is Dragon Skin® 20 or Ecoflex™ 00-30.

In any one or more of the embodiments described herein, the first material or the second material includes a biological polymer.

In any one or more of the embodiments described herein, the first polymer monomeric units and the second polymer monomeric units are each independently selected from the group consisting of the monomeric units of polysaccharide, polypeptide, polynucleotides, and a combination thereof.

In any one or more of the embodiments described herein, the first material or the second material is a tissue or an organ.

In any one or more of the embodiments described herein, the first material or the second material includes an ionogel.

In any one or more of the embodiments described herein, the first polymer monomeric units and the second polymer monomeric units are each independently selected from the group consisting of the monomeric units of poly(acrylamide) (PAAm), poly(acrylic acid) (PAAc), poly(vinylidene fluoride) (PVDF), poly(vinylidene fluoride-co-hexafluoropropylene) (PVDF-co-HFP), poly(methyl methacrylate) (PMMA), cellulose, and a combination thereof.

In any one or more of the embodiments described herein, the ionogel includes an ionic liquid selected from the group consisting of 1-ethyl-3-methylimidazolium, ethylsulfate ([$C_2$mim][EtSO$_4$]), 1-butyl-3-methylimidazolium hexafluorophosphate ([BMIM][PF$_6$]), 1-butyl-3-methylimidazolium chloride ([BMIM][Cl]), (1-butyl-3-methyl-imidazolium tetrafluoroborate ([BMIM][BF$_4$]), 1-butylpyridinium chloride ([BPy][Cl]), 1-butyl-3-methypyridinuim tetrafluoroborate ([BMPy][BF$_4$]), 1-ethyl-3-methylimidazolium bis(trifluoromethylsulfonyl)imide ([EMIM][N(Tf)$_2$]), and a combination thereof.

In any one or more of the embodiments described herein, the first material includes an elastomer and the second material includes a hydrogel.

In any one or more of the embodiments described herein, the first material includes a soft robot or a portion thereof.

In any one or more of the embodiments described herein, the second material includes a sensor, a portion of a sensor, or a conductive cable or wire attached on the soft robot or a portion thereof.

In any one or more of the embodiments described herein, the sensor is selected from the group consisting of strain sensor, force sensor, light sensor, temperature sensor, humidity sensor, and a combination thereof.

In any one or more of the embodiments described herein, the sensor is resistive or capacitive.

In any one or more of the embodiments described herein, the sensor is stretchable or deformable.

In any one or more of the embodiments described herein, the bonds formed by the first bond-forming units and the second bond-forming units are selected from the groups consisting of covalent bonds, ionic bonds, hydrogen bonds, van der Waals interactions, π-π stackings, host-guest interactions, and a combination thereof.

In any one or more of the embodiments described herein, the first bond-forming units and the second bond-forming units are each independently selected from the group consisting of alkyl, silyl, siloxy, amino, amido, imino, hydroxyl, carboxylate, carboxylic acid, sulfido, phenylboronic acid, phenol, benzamide, o-hydroxybenzamide, ammonium ion, quaternary ammonium ion, aniline, anilino, cyano, phenyl, cyclodextryl, adamantyl, cucurbit [7]uril and aminomethylferrocenyl.

In any one or more of the embodiments described herein, the bonds are covalent bonds.

In any one or more of the embodiments described herein, the bonds are carbon-carbon bonds, siloxane bonds, amide bonds, carbon-nitrogen bonds, disulfide bonds, imine bonds, acylhydrazone bonds, or phenylboronate ester bonds.

In any one or more of the embodiments described herein, the bonds are siloxane bonds.

In any one or more of the embodiments described herein, the first bond-forming units and the second bond-forming units each includes a molecular moiety including a silicon atom linked to a functional group selected from a group consisting of OH, Cl, Br, I, OPh, ester, and sulfonate ester.

In any one or more of the embodiments described herein, the first bond-forming units and the second bond-forming units are 3-(trimethoxysilyl) propyl methacrylate.

In any one or more of the embodiments described herein, the bonds are ionic bonds.

In any one or more of the embodiments described herein, the bonds are iron-carboxylate coordination bonds, amine-carboxylate bonds, amine-silanol bonds, or tertiary amine-carboxylate bonds.

In any one or more of the embodiments described herein, the bonds are hydrogen bonds.

In any one or more of the embodiments described herein, the bonds are carboxylic acid and hydroxyl hydrogen bonds, amine and hydroxyl hydrogen bonds, hydroxyl and hydroxyl hydrogen bonds, or amine and phenol hydrogen bonds.

In any one or more of the embodiments described herein, the bonds are hydrophobic interactions or dipole-dipole interactions.

In another aspect, a method of adhering a first material and a second material includes:
  providing a first material including a plurality of crosslinked first polymer chains including a plurality of first polymer monomeric units;
  providing a coating layer on at least a portion of the surface of the first material, wherein the coating layer includes a plurality of adhesion polymer chains, wherein said plurality of adhesion polymer chains includes a plurality of the first polymer monomeric units and a plurality of first bond-forming units, wherein the adhesion polymer chains are interwoven with the crosslinked first polymer chains; and
  providing a second material including a plurality of second polymer chains on at least a surface of the second material, wherein the coating layer is disposed in-between the first material and the second material and contacting the surface of the first material and the second material, and at least a portion of each of the second polymer chains includes a plurality of second polymer monomeric units and second bond-forming units;
  wherein the first bond-forming units and the second bond-forming units form one or more bonds.

In any one or more of the embodiments described herein, the adhesion polymer chains are not covalently bonded to the first polymer chains.

In any one or more of the embodiments described herein, the first material and the second material are each independently selected from the group consisting of a hydrogel, an ionogel, an elastomer, and a biological polymer.

In any one or more of the embodiments described herein, the first material includes an elastomer and the second material includes a hydrogel.

In any one or more of the embodiments described herein, the first material includes a soft robot or a portion thereof.

In any one or more of the embodiments described herein, the second material includes a sensor, a portion of a sensor, or a conductive cable or wire attached on the soft robot or a portion thereof.

In any one or more of the embodiments described herein, the sensor is selected from the group consisting of strain sensor, force sensor, light sensor, temperature sensor, humidity sensor, and a combination thereof.

In any one or more of the embodiments described herein, the sensor is resistive or capacitive.

In any one or more of the embodiments described herein, the bonds formed by the first bond-forming units and the second bond-forming units are each independently selected from the groups consisting of covalent bonds, ionic bonds, hydrogen bonds, van der Waals interactions, π-π stackings, host-guest interactions, and a combination thereof.

In any one or more of the embodiments described herein, the first bond-forming units and the second bond-forming units are each independently selected from the group consisting of alkyl, silyl, siloxy, amino, amido, imino, hydroxyl, carboxylato, carboxylic acid, sulfido, phenylboronic acid, phenol, benzamide, o-hydroxybenzamide, ammonium ion, quaternary ammonium ion, aniline, anilino, cyano, phenyl, cyclodextryl, adamantyl, cucurbit [7]uril and aminomethylferrocenyl.

In any one or more of the embodiments described herein, the bonds are covalent bonds.

In any one or more of the embodiments described herein, the bonds are carbon-carbon bonds, siloxane bonds, amide bonds, carbon-nitrogen bonds, disulfide bonds, imine bonds, acylhydrazone bonds, or phenylboronate ester bonds.

In any one or more of the embodiments described herein, the bonds are siloxane bonds.

In any one or more of the embodiments described herein, the first bond-forming units and the second bond-forming units each includes a molecular moiety comprising a silicon atom linked to a functional group selected from a group consisting of OH, Cl, Br, I, OPh, ester, and sulfonate ester.

In any one or more of the embodiments described herein, the first bond-forming units the and second bond-forming units are 3-(trimethoxysilyl) propyl methacrylate.

Any aspect or embodiment disclosed herein may be combined with another aspect or embodiment disclosed herein. The combination of one or more embodiments described herein with other one or more embodiments described herein is expressly contemplated.

As used herein, the "adhesion polymeric chain" includes, but is not limited to, a polymer which is capable of interweaving into the first polymeric network of the first material, but may or may not form any covalent bond with the first polymeric network or the first material.

As used herein, the term "interweave" or "interwoven" can refer to the phenomena where two or more polymer chains or polymeric networks, or a polymer chain and a polymeric network, weave or become woven together. As used herein, the term "topological adhesion" or "topologically adhered" can refer to the phenomena where two or more polymer chains or polymeric networks, or a polymer chain and a polymeric network, weave or become woven together. As used herein, the term "stick-on," "stuck-on," or "stick-on strategy" can refer to the method of adhering the first and second materials to each other using a coating layer in-between.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein.

Although the terms, first, second, third, etc., may be used herein to describe various elements, these elements are not to be limited by these terms. These terms are simply used to distinguish one element from another element. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "linked to," "on," "connected to," "coupled to," "in contact with," etc., another element, it may be directly linked to, on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms "includes," "including," "comprises," and "comprising" specify the presence of the stated elements or steps but do not preclude the presence or addition of one or more other elements or steps.

DESCRIPTION OF THE DRAWINGS

The invention is described with reference to the following figures, which are presented for the purpose of illustration only and are not intended to be limiting. In the Drawings.

DETAILED DESCRIPTION

Soft pneumatic robots enable a range of applications due to their complex motion, simple control input, and low-impedance interactions. For soft pneumatic robots, sensing techniques can improve accuracy and functionality when grasping or manipulating objects of different shapes and sizes. Existing rigid sensing components (e.g., elastomeric conductors and liquid conductors) are not fully suitable for use in soft pneumatic robots because (i) they are rigid and can limit the deformation and compliance of the underlying soft robotic structure, (ii) their conductivity can degrade over repeated deformation leading to signal drifts, (iii) they may not be biocompatible, and (iv) they require tight sealing to prevent oxidation and leakage, thus requiring complex manufacturing. It remains an unmet challenge to develop robust sensors for soft pneumatic robots. The composite material described in one or more embodiments herein provides a solution to this unmet challenge.

Ionically conductive hydrogels can overcome the limitations of said rigid sensing components because both the mechanical and electrical properties of such hydrogels can be tuned on demand over a wide range. Furthermore, hydrogels resemble ideal conductors, as their resistivity is a material constant and independent of deformation. This feature holds even under large strain and makes hydrogels suitable as large-strain sensors for soft pneumatic robots.

The use of hydrogels as sensors for soft pneumatic robots encounters the problem of poor adhesion between the hydrogel and the elastomer of the robot. This poor adhesion (e.g., below 1 $J \cdot m^{-2}$) arises because hydrogels and elastomers are very dissimilar materials. A method of adhering two dissimilar materials together is an unmet need to enable fabrication of sensors for soft pneumatic robots that have tunable and stable mechanical and electrical properties. The method of adhering two dissimilar materials together described herein provides a solution to this unmet need.

Figure 1A:
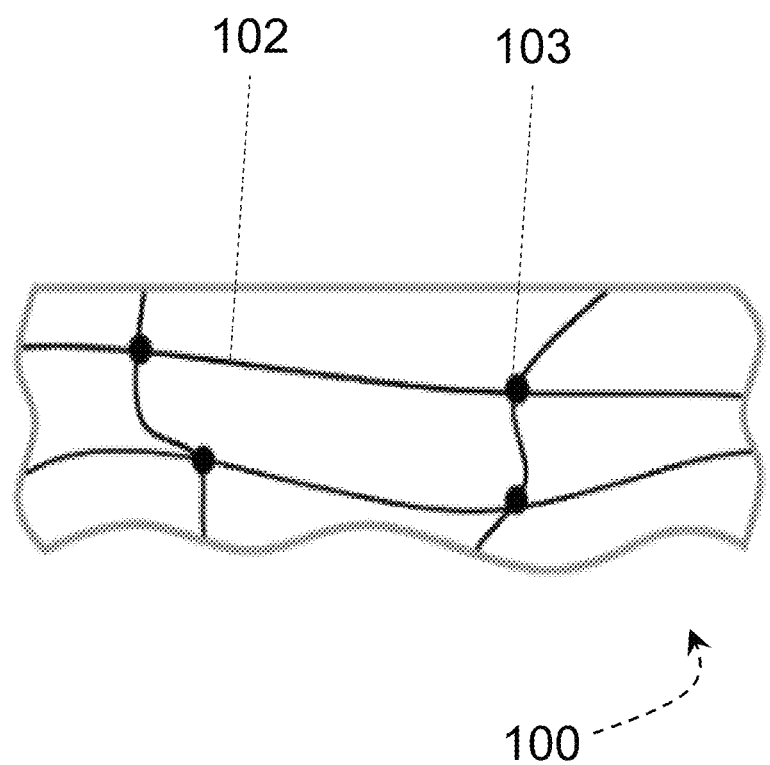
FIG. 1A shows a first material according to one or more embodiments.

The one or more embodiments are now described with reference to FIGS. 1A-1D. As shown in FIG. 1A, in some embodiments, a first material 100 includes a plurality of first polymer chains 102, each including a plurality of first polymer monomeric units. In some embodiments, the first polymer chains 102 are linked together by a crosslinking group 103.

Figure 1B:
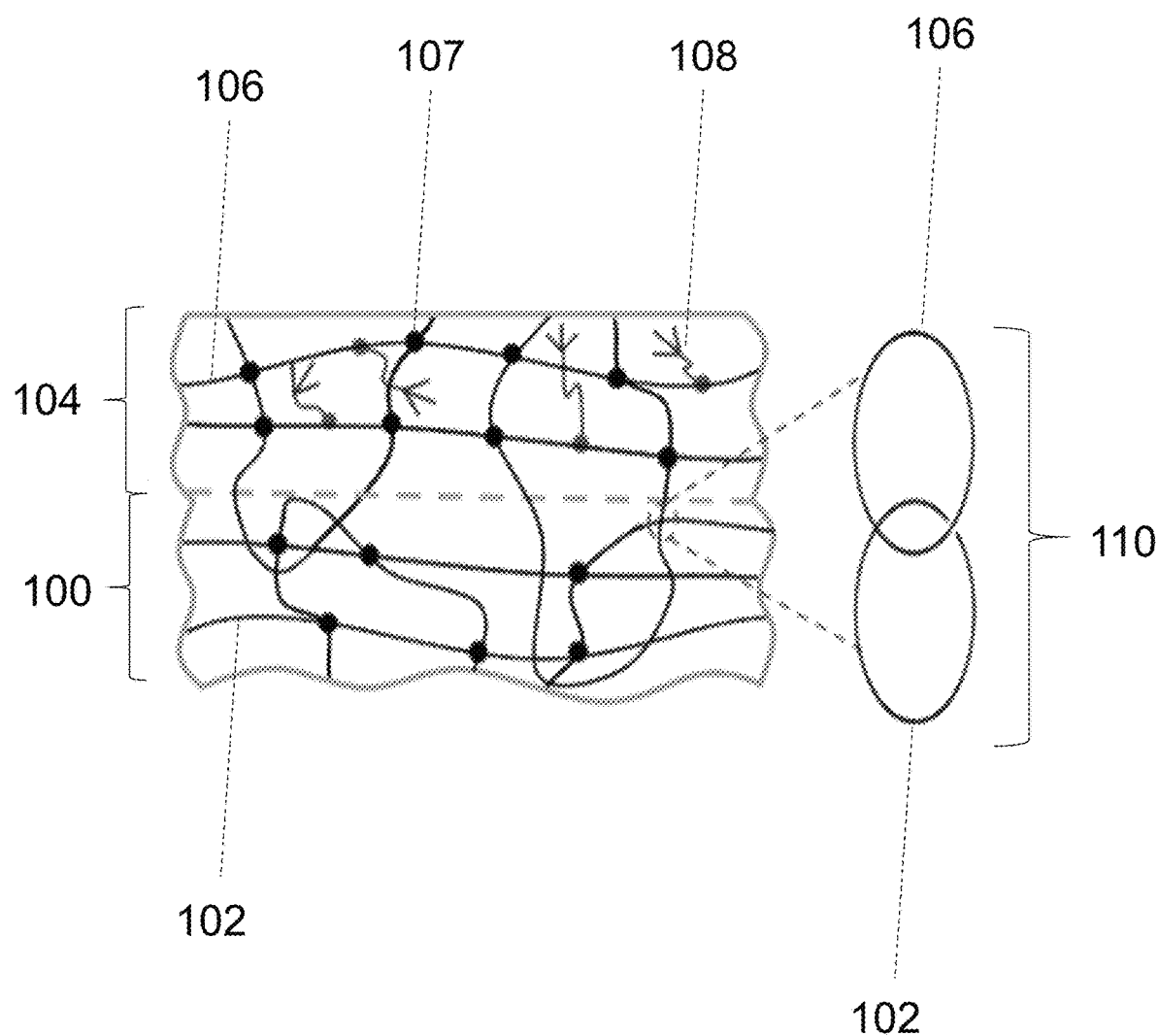
FIG. 1B shows a first material adhered to a coating layer according to one or more embodiments.

As shown in FIG. 1B, a coating layer 104 can be deposited on at least a portion of the surface of the first material 100. In some embodiments, the coating layer 104 includes a plurality of adhesion polymer chains 106, each including a plurality of first polymer monomeric units and a plurality of first bond-forming units 108. In some embodiments, the adhesion polymer chains 106 are interwoven 110 with the first polymer chains 102 to adhere the coating layer onto the first material 100. In some embodiments, the interwoven 110 is also referred to as topological adhesion. In some embodiments, the first polymer chains 102 are linked together by a crosslinking group 103. In some embodiments, the adhesion polymer chains 106 are linked together by a crosslinking group 107. In certain embodiments, the first bond-forming units can be bonded to the first polymer chains 102 and also contains an available reaction site that can subsequently bind to the second material 112.

Figure 1C:
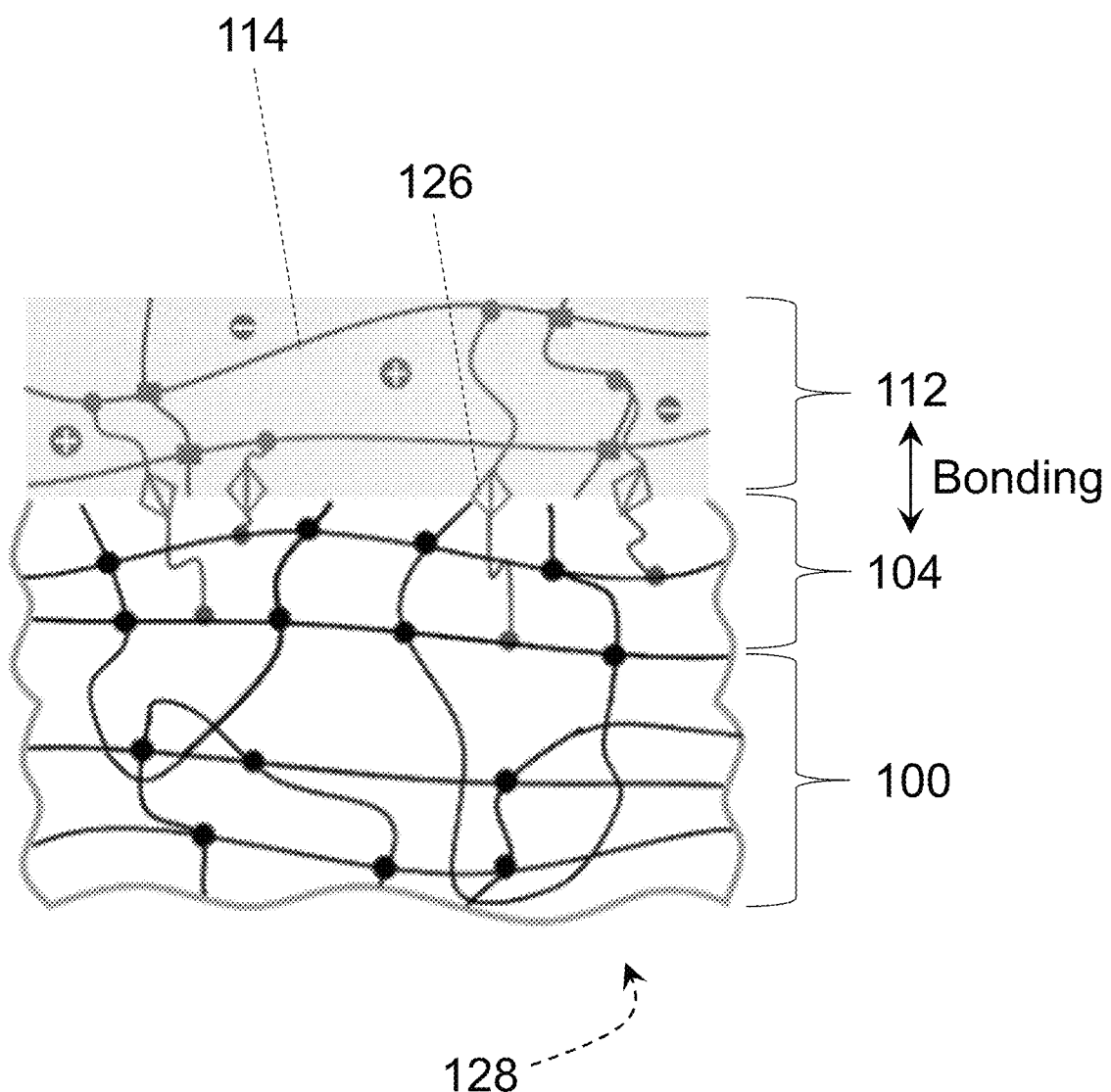
FIG. 1C shows a composite material according to one or more embodiments.
Figure 1D:
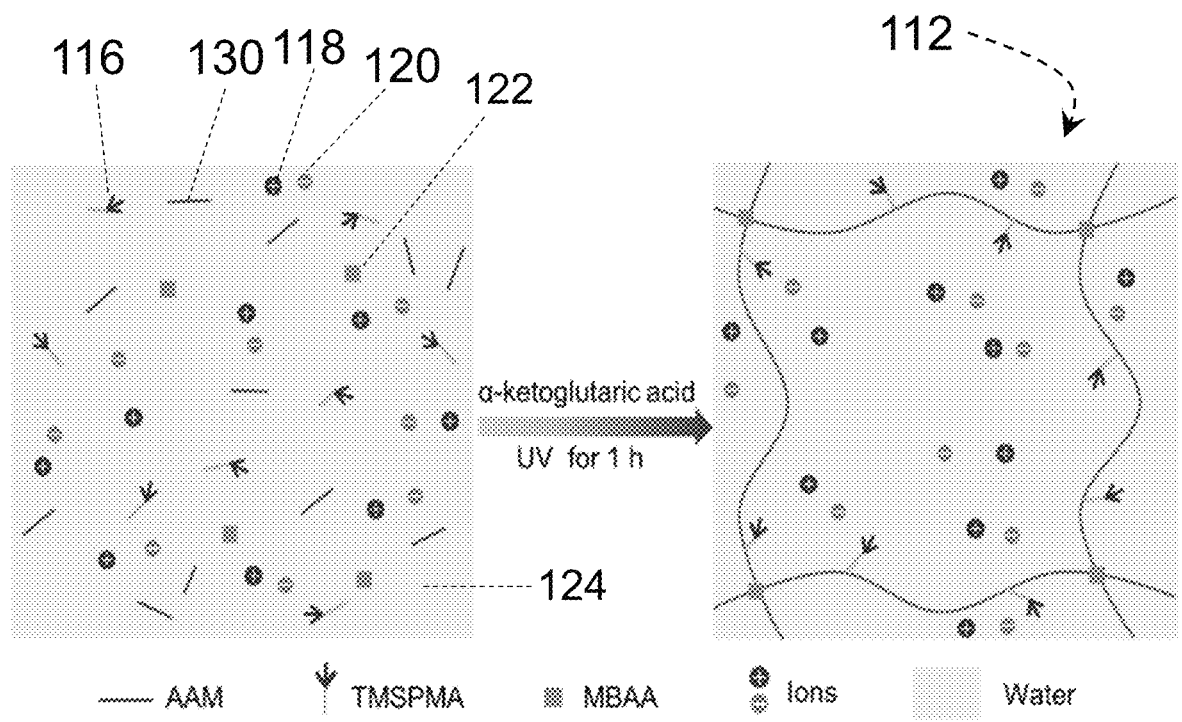
FIG. 1D shows synthesis of a second material according to one or more embodiments.

As shown in FIGS. 1C-1D, a second material 112 can be deposited on at least a portion of the surface of the coating layer 104. In some embodiments, the second material 112 includes a plurality of second polymer chains 114. In some embodiments, the plurality of second polymer chains includes a plurality of second polymer monomeric units 130, second bond-forming units 116, positive ions 118, negative ions 120, crosslinking units 122, and water 124.

In some embodiments, the coating layer 104 is disposed in-between the first material 100 and second material 112 and contacting the surface of the second material 112, wherein the first bond-forming units 108 and second bond-forming units 116 form bonds 126 to adhere the coating layer and second materials together, forming composite material 128.

In some embodiments, the first material 100 and second material 112 are each independently selected from the group consisting of a hydrogel, an ionogel, an elastomer, a biological polymer, a tissue, and an organ. Thus, in some embodiments, the first material 100 is a hydrogel, an ionogel, an elastomer, a biological polymer, a tissue, or an organ. In some embodiments, the second material 112 is a hydrogel, an ionogel, an elastomer, a biological polymer, a tissue, or an organ. In some embodiments, the first material 100 or second material 112 is a hydrogel. In some embodiments, the first material 100 and second material 112 have dissimilar properties and will not adhere together without the use of the coating layer 104 as described herein.

In some embodiments, the first polymer chains 102, adhesion polymer chains 106, and/or second polymer chains 114 is a copolymer, terpolymer, or block copolymer, or a combination thereof.

In some embodiments, the first and/or second polymer monomeric unit is selected from the group consisting of the monomeric units of poly(hydroxyethylmethacrylate) (PHEMA), poly(acrylamide) (PAAm), poly(dimethylacrylamide) (PDMA), poly(N-isopropylacrylamide) (PNIPAM), sodium polyacrylate (NaPAA), poly(acrylic acid) (PAAc), poly(lactic-co-glycolic acid) (PLGA), poly(ethylene glycol) (PEG), poly(ethylene glycol) diacrylate (PEGDA), poly(ethylene glycol) methacrylate (PEGMA), poly(ethylene glycol) dimethacrylate (PEGDMA) alginate, and chitosan, and a combination thereof.

In some embodiments, the first material 100 and/or second material 112 is an elastomer. Non-limiting examples of the monomeric units of the elastomer include the monomeric units of styrene butadiene rubber, polybutadiene rubber, silicone rubber, and polyurethane, and a combination thereof. In some specific embodiments, the silicone rubber is Dragon Skin® 20 or Ecoflex™ 00-30.

In some embodiments, the first material 100 and/or second material 112 is a biological polymer. Non-limiting examples of the monomeric units of the biological polymer include the monomeric units of polysaccharide, polypeptide, and polynucleotides, and a combination thereof.

In some embodiments, the first material 100 and/or second material 112 is a tissue or an organ.

In some embodiments, the first material 100 and/or second material 112 is an ionogel. Non-limiting examples of the monomeric units of the ionogel include the monomeric units of poly(acrylamide) (PAAm), poly(acrylic acid) (PAAc), poly(vinylidene fluoride) (PVDF), poly(vinylidene fluoride-co-hexafluoropropylene) (PVDF-co-HFP), poly(methyl methacrylate) (PMMA) and cellulose, and a combination thereof. In some embodiments, the ionogel is an ionic liquid. Non-limiting examples of ionic liquids include 1-ethyl-3-methylimidazolium, ethylsulfate ([C$_2$mim][EtSO$_4$]), 1-butyl-3-methylimidazolium hexafluorophosphate ([BMIM][PF$_6$]), 1-butyl-3-methylimidazolium chloride ([BMIM][Cl]), (1-butyl-3-methyl-imidazolium tetrafluoroborate ([BMIM][BF$_4$]), 1-butylpyridinium chloride ([BPy][Cl]), 1-butyl-3-methypyridinuim tetrafluoroborate ([BMPy][BF$_4$]), and 1-ethyl-3-methylimidazolium bis(trifluoromethylsulfonyl)imide ([EMIM][N(Tf)$_2$]), and a combination thereof.

In any one or more of the embodiments described herein, the first material 100 or second material 112 is a hydrogel. Non-limiting examples of hydrogels include hydrogels listed in Table 1.

TABLE 1

Non-limiting examples of hydrogels.

| Polymer chain of hydrogel | Molecular structure | Charges on polymer chains |
|---|---|---|
| Poly(hydroxyethylmethacrylate) (PHEMA) | [structure] | Neutral |
| Poly(acrylamide) (PAAM) | [structure] | Neutral |
| Poly(dimethylacrylamide) (PDMA) | [structure] | Neutral |
| Poly(N-isopropylacrylamide) (PNIPAM) | [structure] | Neutral |
| Sodium polyacrylate (NaPAA) | [structure] | Negatively charged |
| [2-(Acryloyloxy)ethyl] trimethylammonium chloride (PDMAEA) | [structure] | Positively charged |

TABLE 1-continued

Non-limiting examples of hydrogels.

| Polymer chain of hydrogel | Molecular structure | Charges on polymer chains |
|---|---|---|
| Polyacrylamide/alginate | 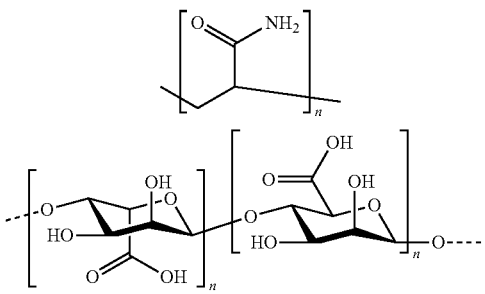 | Neutral/negatively charged |

In some embodiments, the first material 100 is an elastomer and the second material 112 is a hydrogel.

In some embodiments, the first material 100 and/or second material 112 is bio-compatible. The term bio-compatible refers to any material which is compatible with living tissue or a living system and is not toxic, injurious, physiologically reactive, or causing immunological rejection.

In some embodiments, the first material 100 can be a portion of a soft robot.

In some embodiments, the second material 112 includes a sensor, a portion of a sensor or a conductive cable or wire attached on the soft robot or a portion thereof. Non-limiting examples of the sensor include strain sensor, force sensor, light sensor, temperature sensor, and humidity sensor, and a combination thereof. In some embodiments, the sensor is resistive or capacitive. In some embodiments, the sensor is stretchable or deformable.

In some embodiments, the first material 100 or second material 112 is a hydrogel including positive and negative ions. Non-limiting examples of positive ions include $Be^{2+}$, $Mg^{2+}$, $Ca^{2+}$, $Sr^{2+}$, $Ba^{2+}$, $Mn^{2+}$, $Fe^{2+}$, $Cu^{2+}$, $Ni^{2+}$, $Zn^{2+}$, $Al^{3+}$, $Ga^{3+}$, $Fe^{3+}$, $H^+$, $NH^{4+}$, $Li^+$, $Na^+$, $K^+$, $Cs^+$, and $Rb^+$, and a combination thereof. Non-limiting examples of negative ions include $COO^-$, $CO_3^{2-}$, $SO_4^{2-}$, $H_2PO^{4-}$, $HPO_4^{2-}$, $PO_4^{3-}$, $OH^-$, $F^-$, $Cl^-$, $Br^-$, $I^-$, and $NO_3^-$, and a combination thereof.

In some embodiments, the first bond-forming units 108 and second bond-forming units 116 form bonds 126 to adhere the coating layer 104 and second material 112 together. In some specific embodiments, the bonds 126 formed by the first bond-forming units 108 and second bond-forming units 116 are selected from the groups consisting of covalent bonds, ionic bonds, hydrogen bonds, van der Waals interactions, π-π stackings, and host-guest interactions, and a combination thereof. In some embodiments, the bonds 126 are carbon-carbon bonds, siloxane bonds, amide bonds, carbon-nitrogen bonds, disulfide bonds, imine bonds, acylhydrazone bonds, and phenylboronate ester bonds, and a combination thereof. Non-limiting examples of the bonds 126 include bonds described in Table 2. In some specific embodiments, the bonds 126 are hydrogen bonds. In other specific embodiments, the bonds 126 are covalent bonds.

TABLE 2

Non-limiting examples of bonds formed by the first and second bond-forming units.

| Bond types | Representative bonds |
|---|---|
| Static covalent bonds | 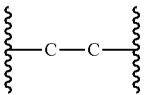<br>Carbon-carbon bond |
| | 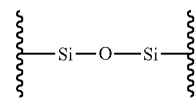<br>Siloxane bond |
| | 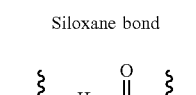<br>Amide bond |

TABLE 2-continued

Non-limiting examples of bonds formed by the first and second bond-forming units.

| Bond types | Representative bonds |
|---|---|
| Dynamic covalent bonds | <br>Carbon-nitrogen bond<br><br>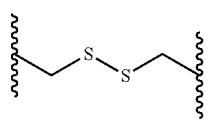 [SMILES: *CSSC*]<br>Disulfide bond<br><br>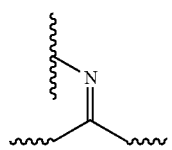<br>Imine bond<br><br>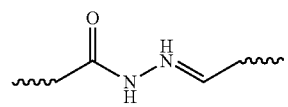<br>Acylhydrazone bond<br><br>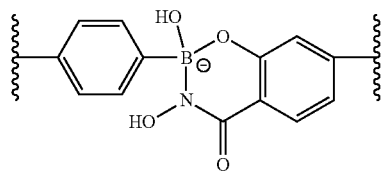 [SMILES: *c1ccc([B-]2(O)Oc3cc(*)ccc3C(=O)N2O)cc1]<br>Phenylboronate ester complexations |
| Ionic bonds | 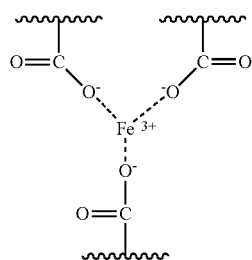<br>Iron-carboxylate coordination complex<br><br>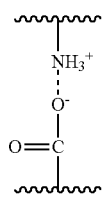<br>Amine-carboxylate |

TABLE 2-continued
Non-limiting examples of bonds formed by the first and second bond-forming units.
| Bond types | Representative bonds |
|---|---|
| | 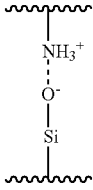<br>Amine-silanol |
| | 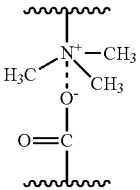<br>Tertiary amine-carboxylate |
| Hydrogen bonds | 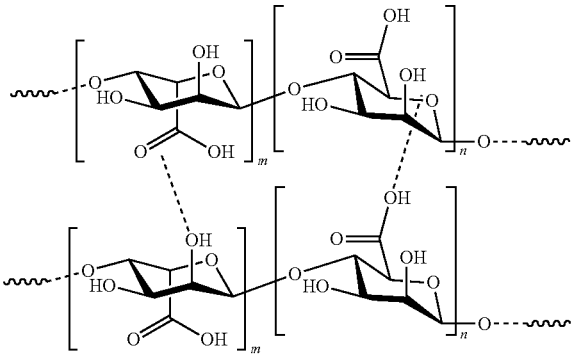<br>Carboxylic acid and hydroxyl |
| | 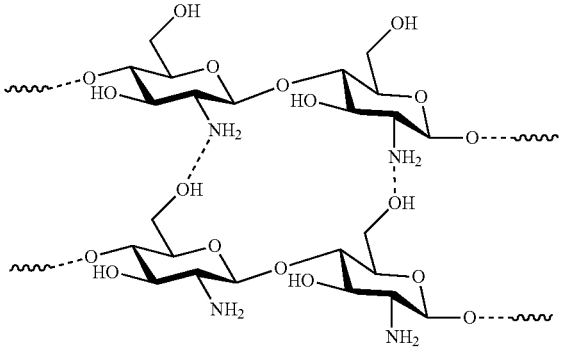<br>Amine and hydroxyl |

TABLE 2-continued

Non-limiting examples of bonds formed by the first and second bond-forming units.

| Bond types | Representative bonds |
|---|---|
| | 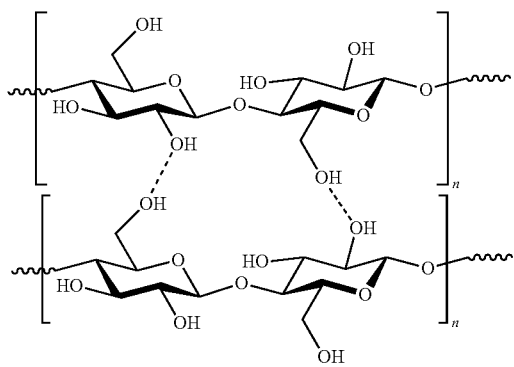<br>Hydroxyl and hydroxyl<br>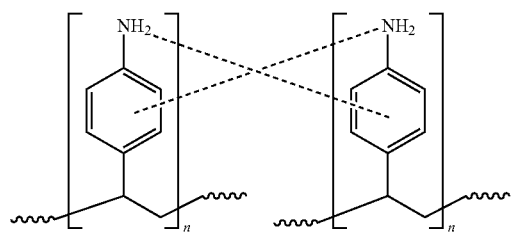<br>Amine and phenol |
| Other noncovalent Interactions* | 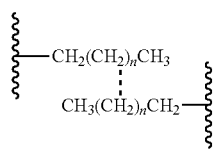<br>n = 10-20<br>Hydrophobic interaction (alkyl chains)<br>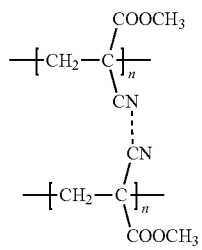<br>Dipole-dipole interaction (nitrile groups)<br>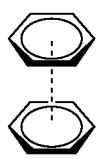<br>π-π stack (phenyl groups) |

Figure 15:
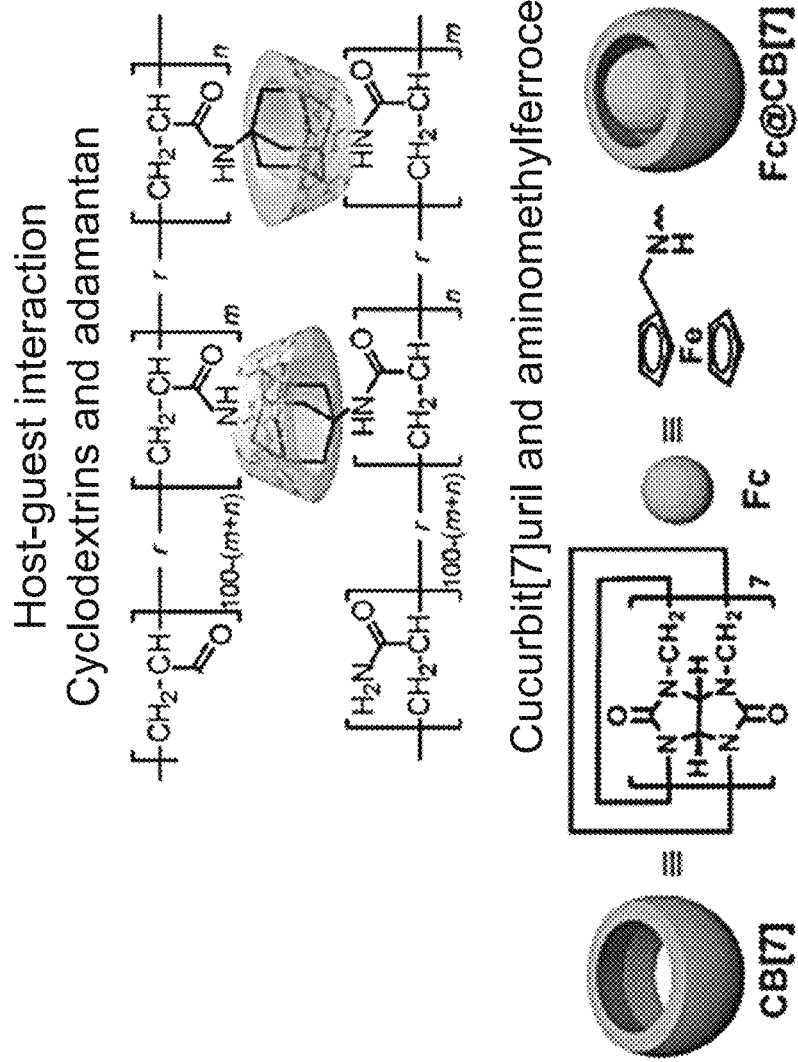
FIG. 15 shows non-limiting examples of bonds formed by the first and second bond-forming units, according to one or more embodiments.

*See FIG. 15 for additional non-limiting examples of other noncovalent interactions.

In some embodiments, the bonds 126 formed by the first bond-forming units 108 and second bond-forming units 116 are permanent, transient, or reversible. In some embodiments, the bonds 126 formed by the first bond-forming units 108 and second bond-forming units 116 are formed in response to a stimulus. Non-limiting examples of the stimulus include pH, salt, temperature, and light, and a combination thereof. In some embodiments, the bond 126 is formed without a stimulus.

In some embodiments, the first bond-forming units 108 and second bond-forming units 116 are each independently selected from the group consisting of alkyl, silyl, siloxy, amino, amido, imino, hydroxyl, carboxylate, carboxylic acid, sulfido, phenylboronic acid, phenol, benzamide, o-hydroxybenzamide, ammonium ion, quaternary ammonium ion, aniline, anilino, cyano, phenyl, cyclodextryl, adamantyl, cucurbit [7]uril, and aminomethylferrocenyl. In some embodiments, the first bond-forming units 108 and second bond-forming units 116 each includes a molecular moiety consisting of a silicon atom linked to a functional group selected from a group consisting of OH, Cl, Br, I, OPh, ester, and sulfonate ester. In some embodiments, the first bond-forming units 108 and second bond-forming units 126 are 3-(trimethoxysilyl) propyl methacrylate.

In some embodiments, the first polymer chains 102 are cross-linked together by a crosslinker 103. In some embodiments, the second polymer chains 114 are cross-linked together by a crosslinker 122. In some embodiments, the adhesion polymer chains 106 are cross-linked together by a crosslinker 107. A non-limiting example of a crosslinker is N,N'-methylenebisacrylamide (MBAA).

In some embodiments, the adhesion energy between the first material 100 and the second material 112 is greater than the internal bonding energy of the first material 100, second material 112, or coating layer 104. In some embodiments, the adhesion energy between the first material 100 and the second material 112 is about 10, 20, 30, 40, 50, 60, 70, 80, 90, or 100 J m$^{-2}$, or in any range bounded by any two values disclosed hereon. In some embodiments, when the first material 100 is pulled away from the second material 112, the first material 100 or second material 112 ruptures; the interfaces between the first material 100 and the coating layer 104 and the interface between the second material 112 and the coating layer 104 do not rupture. Therefore, a composite material 128 with strong adhesion between the first material 100 and second material 112 and the coating layer 104 is obtained. In some embodiments, the composite material 128 can be stretched to about 2, 3, 4, 4.5, 5, 6, 7, 8, 9, or 10 times its original dimension in any direction without debonding of the first material from the second material, and without affecting its properties (e.g., electrical properties such as impedance and resistivity when the first material 100 or second material 112 includes a hydrogel-based sensor). In some embodiments, the composite material 128 can undergo a strain of up to about 150%, 200%, 250%, 300%, 350%, 400%, 450%, or 500% in any direction without debonding of the first material 100 from the second material 112.

In some embodiments, the second material 112 is a hydrogel sensor and maintains stable performance during cyclic loading over about 500, 1000, 1500, or 2000 cycles. In some embodiments, the hydrogel sensor exhibits a bandwidth from static up to about 1, 2, 3, 4, 5, 6, 7, 8, 9, 10, or 15 Hz.

The one or more embodiments are now described with reference to FIG. 1D. In some embodiments, the second material 112 is formed by polymerizing and crosslinking a plurality of first polymer monomeric units 130, second bond-forming units 116, crosslinking units 122, positive ions 118, and negative ions 120 in the presence of water 124.

A method for adhering a first material 100 and second material 112 includes providing a first material 100. In some embodiments, the method includes applying a coating layer 104 on at least a portion of the first material 100. In some embodiments, the method includes interweaving 110 the adhesion polymer chains 106 with the first polymer chains 102 to adhere the coating layer 104 onto the first material 100. In some embodiments, the method includes providing a second material 112 such that the coating layer 104 is disposed in-between the first material 100 and the second material 112. In some embodiments, the method includes forming bonds 126 between the first bond-forming units 108 and second bond-forming units 116 to adhere the coating layer 104 and the second material 112 together, forming composite material 128.

In some embodiments, the first material 100 and/or second material 112 is a dry material. In other embodiments, the first material 100 and/or second material 112 is a wet material including a solvent. Non-limiting examples of the solvent include water and an organic solvent, which includes, but is not limited to, ethanol, dichloromethane, THF, acetone, acetonitrile, and toluene, and a combination thereof.

In some embodiments, the adhesion polymer chains 106 are covalently bonded to the first polymer chains 102. In some embodiments, the adhesion polymer chains 106 are not covalently bonded to the first polymer chains. In some embodiments, the adhesion polymer chains 106 interweave 110 with the first polymer chains 102 to topologically adhere 100 the coating layer 104 onto the first material 100.

Therefore, in some embodiments, the composite material 128 and its method of fabrication enables the use of conductive hydrogels as sensors for soft pneumatic robots by overcoming the problem of adhering together materials with dissimilar chemical identities. In some embodiments, the first material 100 is an elastomer and the second material 112 is a hydrogel, which are too chemically dissimilar to adhere together on their own. The addition of coating layer 104, which includes a plurality of first bond-forming units 108, to the first material is possible using topological adhesion between the first polymer chains 102 and adhesion polymer chains 106 because the two materials are of similar chemical identity. Bonds 126 between the first bond-forming units 108 and second bond-forming units 116 of the second material 112 adhere the second material 112 to the coating layer 108. Thus, the combination of the coating layer 104 and bonds 126 allow the first material 100 and second material 112 to adhere together strongly despite having dissimilar chemical identities. This further allows the second material (e.g., hydrogel) to be attached to a soft robot (e.g., elastomer), enabling the use of hydrogels as sensors for soft robots.

The method for fabricating composite material 128 decouples sensor and robot fabrication (i.e., the first material 100, coating layer 104, and second material 112 are fabricated separately and later adhered together), thereby simplifying manufacturing. This can increase the range of robot configurations that can be constructed over what would be feasible from de novo synthesis of each robot-sensor configuration.

Additional examples of the compositions, methods of fabricating, and methods of using the adhesion polymer chains can be found, for example, in International Application No. PCT/US2019/022890, the entire content of which is hereby incorporated by reference.

EXAMPLES

In some embodiments, facile "stick-on" composition and method are disclosed, which enable strong adhesion between hydrogels and elastomers without interfering with the bulk properties of elastomer. In some specific embodiments, the method is based on a silane chemistry mechanism. In these embodiments, given a preformed elastomer, the surface is coated with a thin layer of elastomer with identical chemistry to that of the elastomer but modified with silanes such that the bulk of the elastomer maintains its original properties. Then, in these embodiments, a piece of hydrogel that is also modified with silanes is adhered onto the surface of the elastomer. In some embodiments, after condensation, the silanes on the two materials form covalent siloxane bonds. In some embodiments, a large-strain sensor is fabricated by bonding a layer of hydrogel onto an elastomer substrate. In some embodiments, this large-strain sensor is characterized via a quasi-static test, long-term fatigue test and dynamic test. Applicants have surprisingly found that the tests showed that the sensor can sense large strains without delamination between the hydrogel and elastomer, maintain stable performance during cyclic loading over 1500 cycles, and exhibit a bandwidth from static up to 10 Hz that is sufficient for most applications of soft robots. Finally, in some embodiments, these stick-on sensors were applied and validated for use with soft robots by integrating a hydrogel sensor with a soft pneumatic actuator. In some embodiments, the hydrogel sensor can effectively measure the bending angle of the actuator throughout inflation process without interfering with deformation. The experimental results substantiated the use of hydrogels as large-strain sensors on soft robots, enabling configuration control of these soft robots and promoting the development of wearable devices that leverage strain-, chemical- or temperature-responsive gels to achieve bionic functionality.

Materials

Acrylamide (AAm, A8887), lithium chloride (LiCl, 310468), N,N'-methylenebisacrylamide (MBAA, M7279), α-ketoglutaric acid (75890), 2-hydroxy-4'-(2-hydroxyethoxy)-2-methylpropiophenone (Iragcure2959, 410896), ethyl alcohol (459844) and 3-(trimethoxysilyl) propyl methacrylate (TMSPMA, 440159) were purchased from Sigma-Aldrich (St. Louis, MO). Polydimethylsiloxane (PDMS, Sylgard 184) was purchased from Dow Corning (Midland, MI). Ecoflex™ 00-30 and Dragon Skin® were purchased from Smooth-On, Inc. (Macungie, PA). All adapters, screws, nuts, tubes and acrylic sheets were purchased from McMaster-Carr (Elmhurst, IL). All materials were used as received.

Synthesis and Mechanism of the Composite Material

First, the hydrogel was synthesized by randomly copolymerizing silanes, (3-(trimethoxysilyl) propyl methacrylate (TMSPMA)), with acrylamide (AAm) and N,N'-methylenebisacrylamide (MBAA) crosslinker (FIG. 1A). After curing under UV for 1 h, silanes were incorporated onto the polyacrylamide (PAAm) chains. α-ketoglutaric acid was used at the photoinitiator for crosslinking. The pH of the hydrogel was tuned to 3.5 so that the silanol groups do not condense immediately after polymerization. Lithium chloride, a hygroscopic salt, was used at a concentration of 8.0 M to enhance the conductivity of the hydrogel and prevent it from drying out. The silane-modified hydrogel was then bonded with the elastomer via a stick-on strategy (FIG. 1B). Unless otherwise specified, the elastomer used in this work was highly-compliant silicone rubber (Ecoflex™ 00-30, Smooth-On, Inc., Macungie, PA). Given a prefabricated elastomer, its surface was coated with a thin layer of the same elastomer modified with silane. The polymer chains of the silane-modified elastomer penetrated into and entangled with the pre-formed elastomer due to their identical chemistry, causing topological adhesion. After curing of the silane-modified elastomer, the silane-modified hydrogel was attached onto the surface. After curing at 65° C. for 24 h, silanes on the hydrogel network and elastomer network condensed with each other to form siloxane bonds. In some embodiments, the thin layer of silane-modified elastomer serves as a link, connecting the prefabricated elastomer topologically and simultaneously bonding to the hydrogel covalently.

Note that in some embodiments, during fabrication, only the surface of the elastomer was modified; thus, the bulk properties of the elastomer were preserved. Also, in some embodiments, the hydrogel is not directly synthesized on the elastomer surface, which can be technically difficult. Instead, the hydrogel and elastomer are separately fabricated and then stuck together. In some embodiments, this stick-on strategy greatly simplifies the fabrication of hydrogel/elastomer hybrids and is beneficial for making hydrogels as sensors for elastomeric robots, in which the elastomers are prefabricated, the bulk properties have already been optimized and the geometries are frequently complex.

Figure 2A:
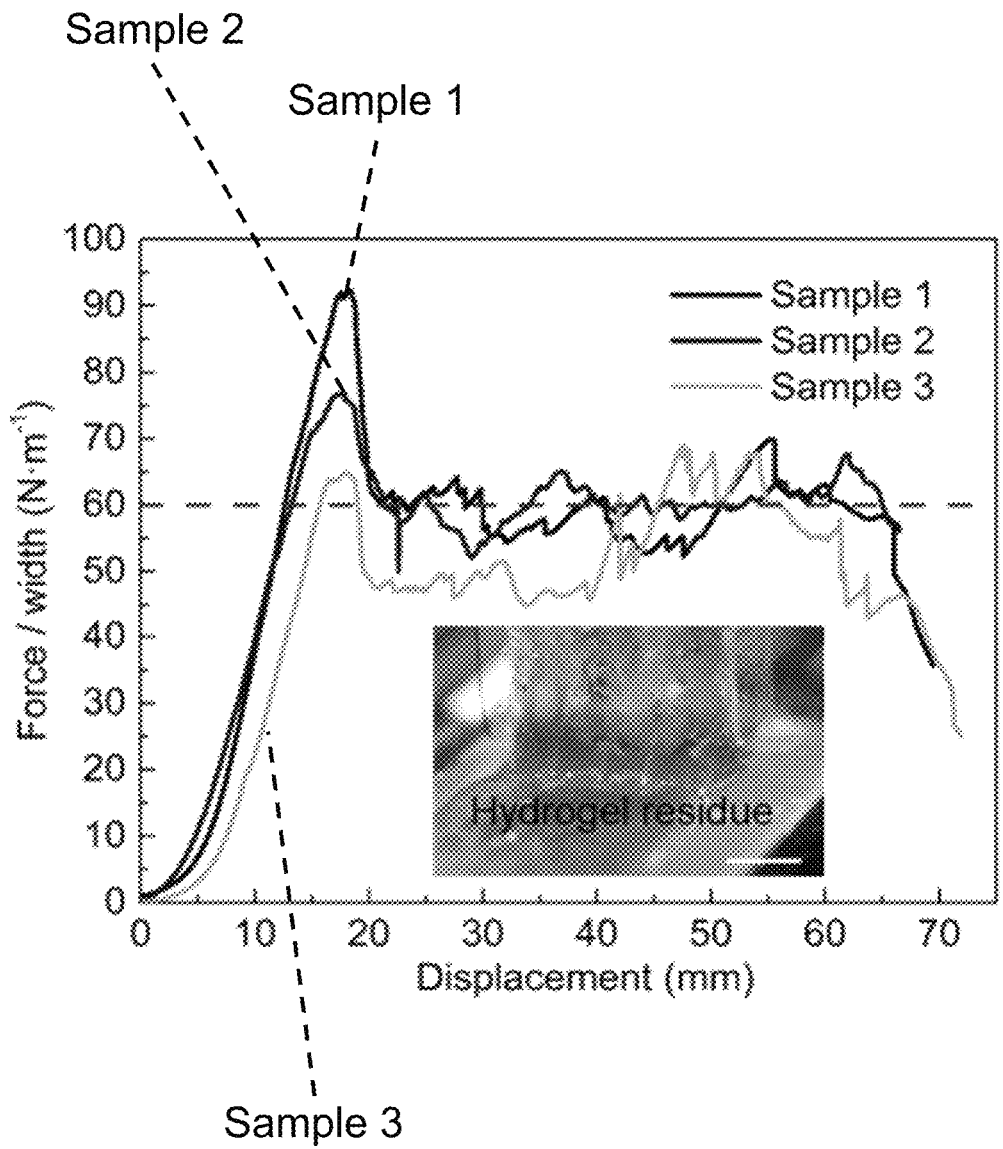
FIG. 2A shows adhesion of a hydrogel and an elastomer measured by force displacement curves according to one or more embodiments.
Figure 2B:
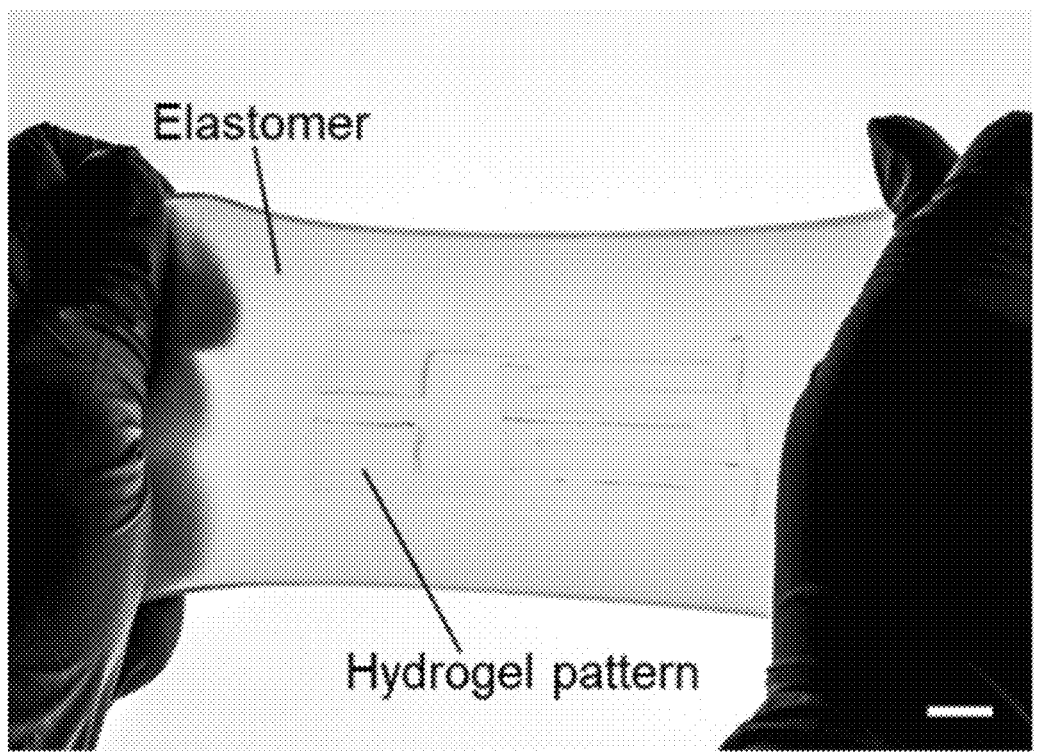
FIG. 2B demonstrates stretching of the bilayer to more than twice its original length without debonding between the hydrogel and elastomer according to one or more embodiments.
Figure 3:
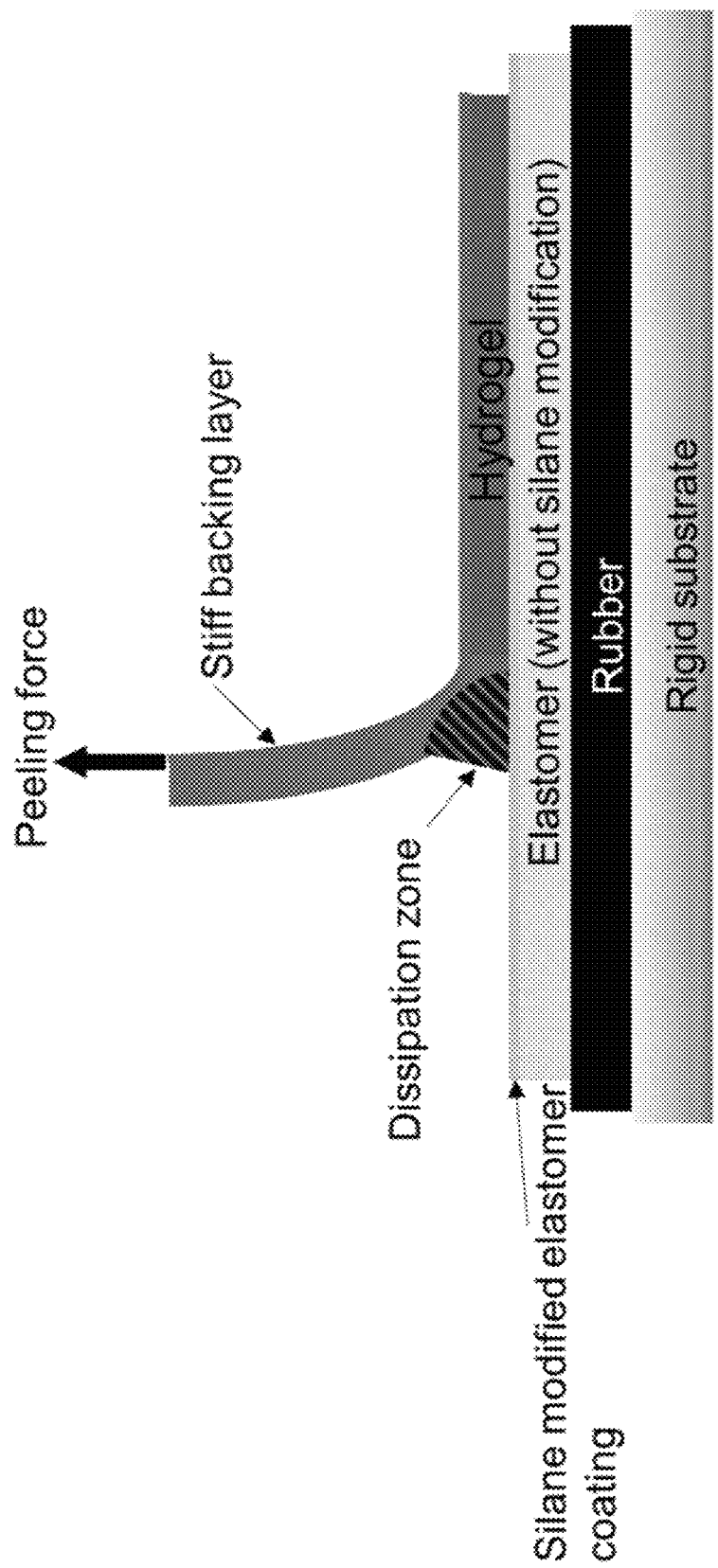
FIG. 3 shows a schematic of the experimental setup for a 90° peeling test, used to measure the adhesion between the hydrogel and an elastomer, according to one or more embodiments.

In order to evaluate the bonding between the hydrogel and elastomer, the adhesion energy between the two materials was tested using 90-degree peeling tests (FIG. 3). Typical force-displacement curves (FIG. 2A) show an adhesion energy of about 60 J m$^{-2}$. During the peeling, cohesive fracture occurred, cracks propagated in the hydrogel, and hydrogel residues were observed on both the elastomer and the backing layer (FIG. 2A, inset). The hydrogel did not detach from the elastomer surface even when the hydrogel fractured, indicating that the adhesion energy is higher than the toughness of the hydrogel. To demonstrate the notable combination of adhesion and stretchability, a fully transparent hydrogel was patterned on a 2 mm-thick transparent elastomer, and the bilayer was stretched to more than twice its original length without debonding between the hydrogel and elastomer (FIG. 2B).

Synthesis of the Hydrogel

For every 1 mL solution, 2.0 M of acrylamide and 8.0 M of lithium chloride were dissolved in distilled water. Then, 4 μL of N,N'-methylenebisacrylamide (MBAA) at 0.1 M, 20 μL of α-ketoglutaric acid at 0.1 M, and 1.9 μL of 3-(trimethoxysilyl) propyl methacrylate were added. The precursor was stirred for 1 minute and the solution was poured into a mold with dimensions 25 mm×2.5 mm×3 mm. The mold was made of acrylic sheet cut with a laser cutter (Helix 24 Laser, Epilog, Golden, CO) and assembled using cyanoacrylate glue (KG925, Krazy Glue, High Point, NC). After exposing to UV (15 W 365 nm; UVP XX-15L, 2 cm distance between sample and lamp) for 1 h, the precursor was transformed to gel.

Synthesis of the Silicone Rubber Elastomer

Ecoflex™ 00-30/Dragon Skin® 20 rubber precursor was prepared by mixing the base and curing agent at a weight ratio of 1:1. After mixing and degassing in a mixer (Thinky ARE-250, Laguna Hills, CA), a homogeneous and bubble-free precursor was obtained. Then, the precursor was cast into a mold with dimensions 40 mm×4 mm×1.5 mm and cured at 65° C. for 2 h.

Synthesis of the Soft Actuator Coated with a Thin Layer of Silane-Modified Elastomer The soft actuator was fabricated via molding (FIG. 4). After the actuator fabrication, a silane-modified elastomer precursor containing triethoxyvinylsilane (TEVS) (0.2 wt.

%) was then coated onto the surface of the actuator with the thickness around 100 microns. After curing at 65° C. for 2 h, the actuator was coated with a thin layer of silane-modified elastomer. Note that, in some embodiments, the silane-modified layer will not debond from the upper section of the actuator during inflation if the bonding surfaces are clean.

Adhesion Process Between Hydrogel and Elastomer

After the synthesis of the hydrogel and elastomer, a piece of silane-modified hydrogel was placed onto the surface of elastomer (i.e., a "stick-on" process. The hydrogel is infused with salt to enhance conductivity and water retention capacity. After 24 h at 65° C., the silanes on the hydrogel network and elastomer network formed siloxane bonds to covalently bond the two networks.

To assess adhesion between the hydrogel and the elastomer, force-displacement curves were measured by 90° peeling tests (FIG. 2C). FIG. 3 shows a schematic of the peeling test. Because the elastomer could not be bonded to the rigid substrate (an acrylic sheet) directly, another layer of rubber (styrene butadiene rubber) was used as an interlayer. A stiff backing layer was also bonded to the hydrogel to constrain the stretch of the hydrogel during the test. The peeling speed was fixed at 10 mm min$^{-1}$. The hydrogel was and 3-(trimethoxysilyl) propyl methacrylate (TMSPMA)-modified polyacrylamide (PAAm) hydrogel containing 8.0 M lithium chloride. The elastomer was triethoxyvinylsilane (TEVS)-modified elastomer. The average adhesion energy was about 60 J m$^{-2}$. A crack propagated through the hydrogel, and hydrogel residues were observed on both the elastomer substrate and the backing layer, indicating strong adhesion between hydrogel and elastomer. Furthermore, the hydrogel-elastomer bilayer was stretched to more than twice its original length without debonding between the hydrogel and elastomer.

Measurement Analysis and Quasi-Static Behavior of Sensors

Figure 4A:
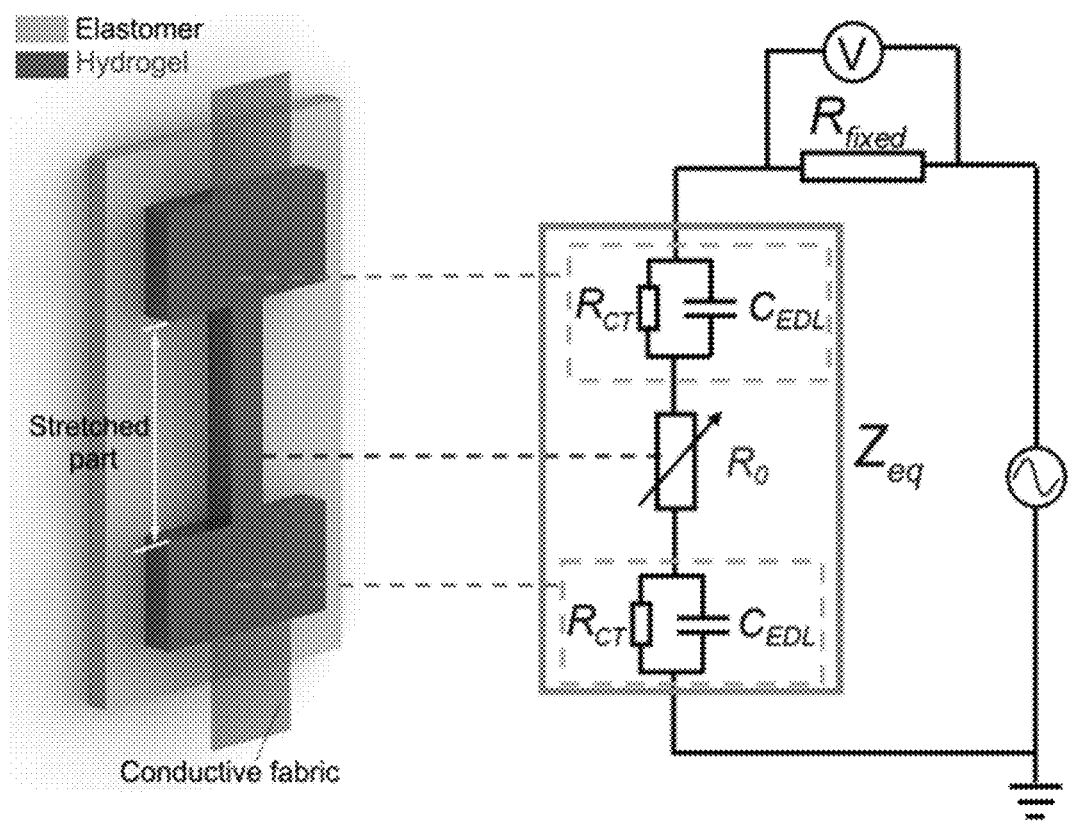
FIG. 4A shows a schematic of the testing sample used for quasi-static characterization of the hydrogel-based large-strain sensor according to one or more embodiments.

Quasi-static tests on hydrogel sensors were conducted to validate the feasibility of using hydrogels as large-strain sensors for soft robots. In a testing sample, the hydrogel was made into a dumbbell shape and bonded to a rectangular elastomer substrate (FIG. 4A, left). The two ends of the hydrogel were in contact with two strips of silver fabric to connect to an external measuring circuit. The two ends of the overall structure were confined by rigid acrylic sheets in order to ensure that the electrical connection is stable and that only the slender part of the hydrogel was stretched. In an equivalent circuit (FIG. 4A, right), the slender part of the hydrogel was modeled as a pure resistance, $R_\theta$, and the end of the hydrogel was modeled by using the Randles circuit model, namely a capacitor, $C_{EDL}$, in parallel with a resistor, $R_{CT}$. Here, $C_{EDL}$ was attributed to the electric double layer (EDL) forming at the interface between the ionic conductor (e.g., hydrogel) and the electronic conductor (e.g., silver fabric), and $R_{CT}$ was attributed to the charge transfer resistance. A fixed resistor $R_{fixed}$ was in series and connected to an alternating voltage source. The amplitude of the testing voltage was restricted to 1 V so that the electric double layers (EDLs) behaved like capacitors without breakdown.

Figure 4B:
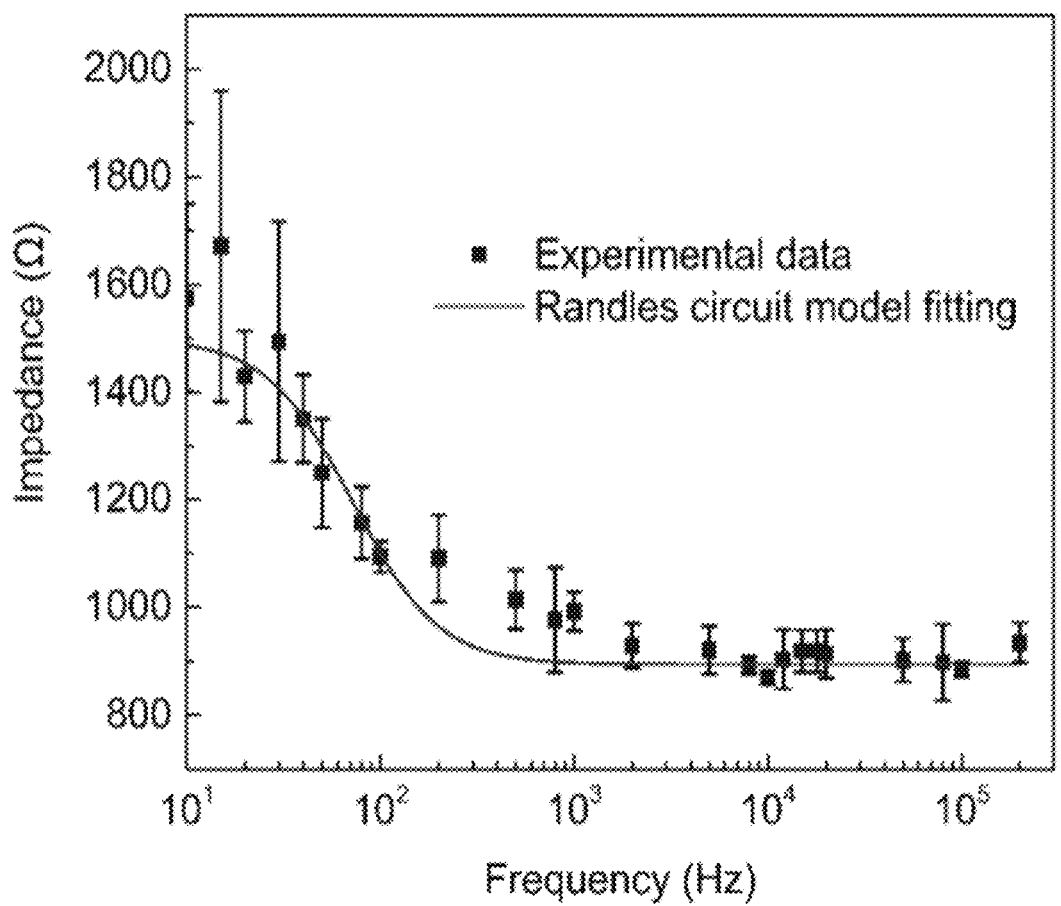
FIG. 4B shows impedance of the sensor, $Z_{eq}$, as a function of measuring frequency according to one or more embodiments.

For the electric double layer (EDL), charges were separated at an atomic distance; thus, the capacitance per unit area, $C_{EDL}$, was large; on the order of $10^{-1}$ F m$^{-2}$. The area of the EDL, $A_{EDL}$, described here was on the order of $10^{-4}$ m$^2$. For a measuring frequency, f, of 10 kHz, the impedance of the electric double layer (EDL) was estimated as $$X_C = \frac{1}{2\pi f C} \approx 1 \Omega,$$

where $C = c_{EDL} \cdot A_{EDL}$. For the slender part of the hydrogel with length l=25 mm, width w=2.5 mm and thickness t=2 mm, the resistance was calculated as $R_0 = (\rho l)/(wt) = 500 \Omega$, where $\rho \sim 10^{-1}$ $\Omega \cdot$m is the resistivity of the hydrogel doped with 8.0 M lithium chloride. The equivalent impedance of the electric double layer (EDL) was negligible compared to that of the slender part of the hydrogel, so long as the measuring frequency is sufficiently high. In some embodiments, the impedance of the hydrogel sensor can be calculated and measured as $$Z_{eq} = \frac{U_{total} - U_{R_{fixed}}}{U_{R_{fixed}}} \Box R_{fixed} \qquad (1)$$

where $U_{total}$ is the amplitude of the applied voltage and $U_{R_{fixed}}$ is the partial voltage on $R_{fixed}$. The relevant derivation is shown below. The impedance was measured as a function of measuring frequency, and the theoretical prediction closely matched experimental data (FIG. 4B). The Randles circuit model is used to describe the equivalent impedance, $Z_{eq}$, of the sensor. The theoretical result predicted by the Randles circuit model closely approximates experimental data. Details regarding the derivation are provided below. Impedance reached a minimum and stabilized at the resistance of the slender part of the hydrogel when the measuring frequency was higher than 1 kHz.

Figure 4C:
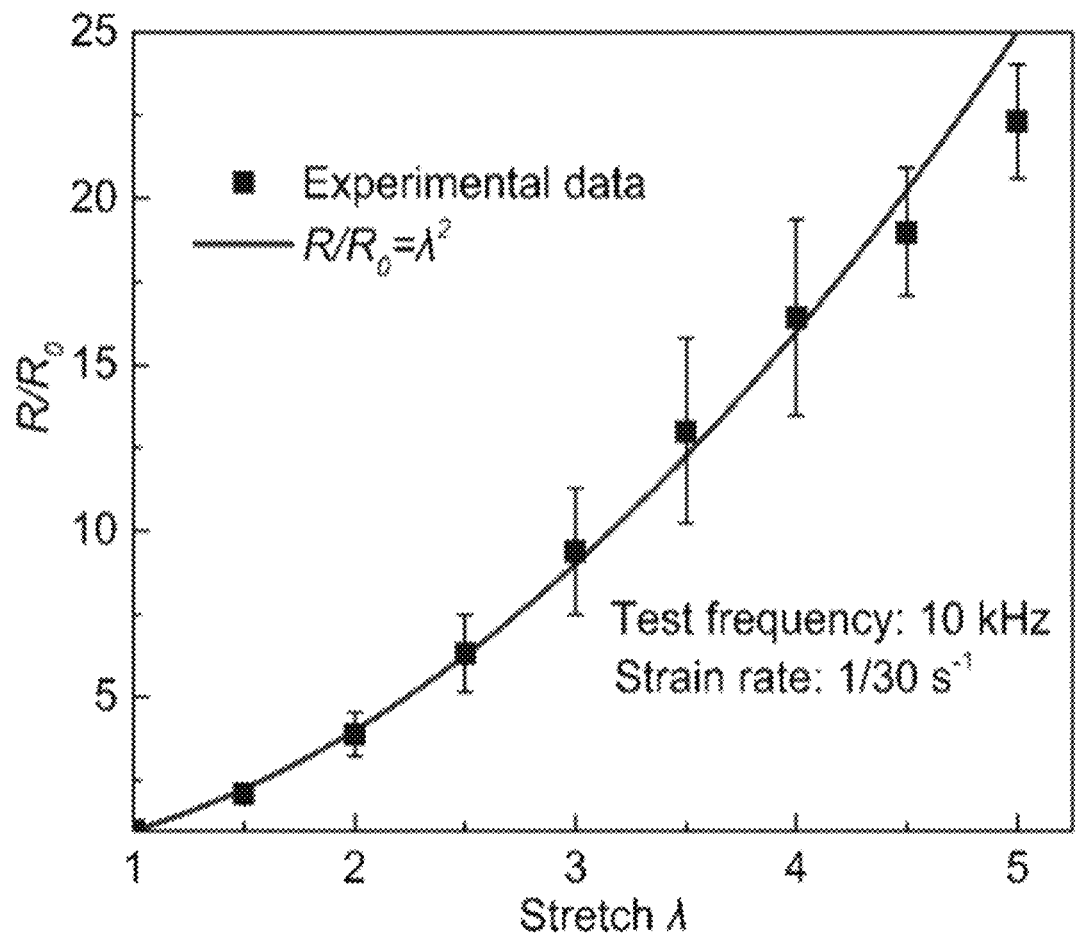
FIG. 4C shows the change of resistance of the slender part of the sensor as the sample is stretched according to one or more embodiments.
Figure 4D:
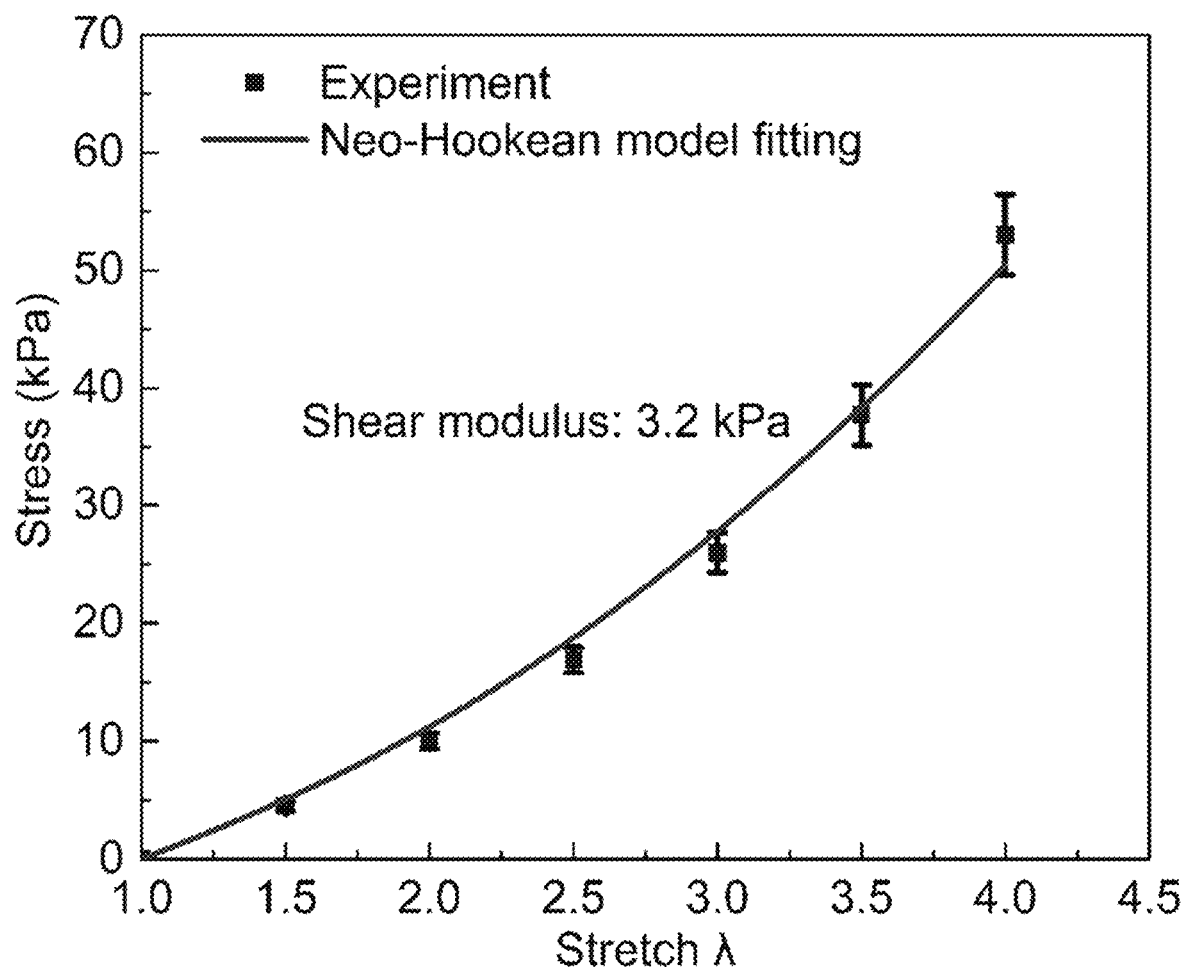
FIG. 4D shows a stress-stretch curve from a uniaxial tensile test of silane-modified polyacrylamide (PAAm) hydrogel containing 8.0 M LiCl according to one or more embodiments.

Note that, in some embodiments, the stretch of a hydrogel only changes the configuration of its polymer network and water molecules, having a negligible effect on its ionic conductivity. Recall that, in some embodiments, the resistance of the slender part of the hydrogel is $R=(\rho l)/(A)$, where A is the cross-sectional area. When the hydrogel was stretched to $\lambda$ times its original length, the cross-sectional area was reduced by a factor of $\lambda$ due to incompressibility. As a result, in these embodiments, the ratio of the resistance of the stretched hydrogel (R) to that of the unstretched hydrogel ($R_0$) is $$R/R_0 = \lambda^2, \qquad (2)$$

indicating that the ratio of resistances solely depends on the stretch. In some embodiments, this property makes hydrogels ideal as large-strain sensors, whereas existing sensors degrade under large deformation. The experimentally-measured relationship between the ratio of resistances and stretch was also consistent with the theoretical prediction by equation (2) (FIG. 4C). The measuring frequency is fixed at 10 kHz to eliminate the contribution of electric double layers, such that the impedance is dominated by the resistance of the slender part, $|Z_{eq}| \sim R_0$. The solid line represents the relationship between resistance and stretch for an ideal incompressible conductor, for which the resistivity and volume are independent of stretch. When such a conductor is stretched to $\lambda$ times its original length, its cross-sectional area is reduced by a factor of $\lambda$. Consequently, the ratio of the resistance of the stretched conductor (R) to that of the undeformed conductor ($R_0$) is $R/R_0 = \lambda^2$. In addition, in some embodiments, the gauge factor (GF) of a hydrogel strain sensor is $$GF = \frac{\Delta R/R_0}{\varepsilon} = \frac{\lambda^2 - 1}{\lambda - 1} = \lambda + 1, \quad (3)$$

where $\Delta R$ is the resistance variation of the sensor and $\varepsilon$ is the strain. Thus, in these embodiments, gauge factor (GF) only depends on the deformation as well. Given the large stretchability of hydrogels, the gauge factor (GF) ranged from 2 to 6.

Figure 4E:
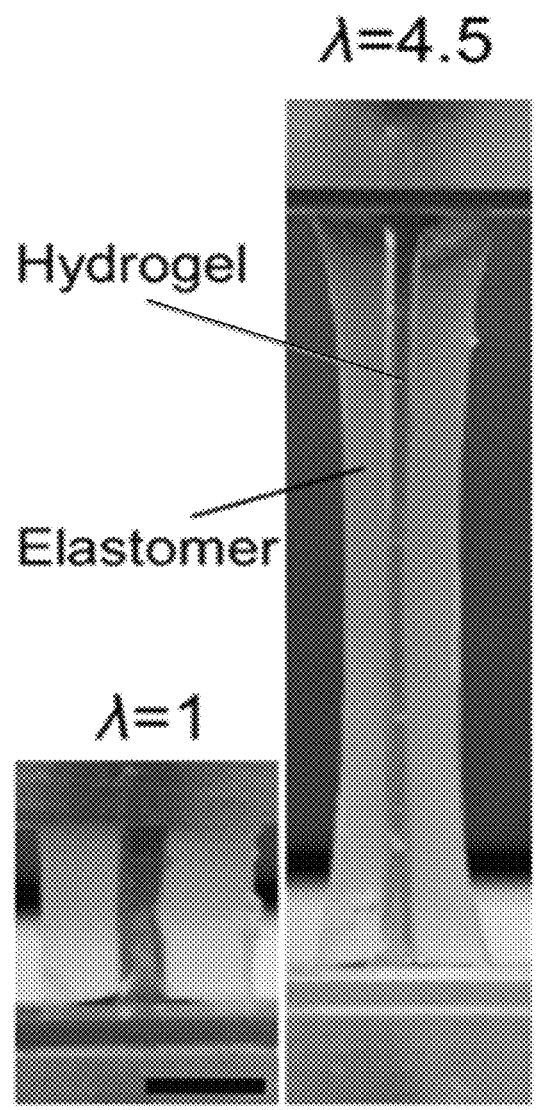
FIG. 4E shows photographs of the sensor before and after stretch according to one or more embodiments.

To verify the stretchability and adhesion stability of the hydrogel sensor, the sensor was stretched using a tensile machine while simultaneously conducting electrical measurements. The hydrogel, which had a shear modulus around 3.2 kPa (FIG. 4D), was much softer than the elastomer, which had a shear modulus of 30 kPa. A maximum stretch of ~4.5 was achieved without debonding between the hydrogel and elastomer (FIG. 4E). In these embodiments, this maximum stretch of 4.5 before hydrogel fracture is exceptional compared to other studies and shows that the sensor can be used to measure the deformation of soft robots undergoing very large deformations.

Impedance Derivation

In some embodiments, the theoretical impedance of the hydrogel sensor in a practical circuit follows from equation 1. Let $a=R_{CT}$, $b=2\pi C_{EDL}$, f be the measuring frequency and $Z_p$ be the impedance of the equivalent charge transfer resistor and capacitor that comprise the electric double layer (EDL). These quantities satisfy $$\frac{1}{Z_p} = \frac{1}{Z_{R_{CT}}} + \frac{1}{Z_{C_{EDL}}} = \frac{1}{a} + \frac{1}{\frac{1}{bfj}} = \frac{1}{a} + bfj \quad (5)$$

where j is the imaginary unit. Thus, $Z_p$ is $$Z_p = \frac{a}{1 + abfj} = \frac{a(1 - abfj)}{1 + a^2 b^2 f^2}. \quad (6)$$

Let $r=R_0$. Then the total impedance of the hydrogel sensor is $$Z_{eq} = |Z_{total}| = |2Z_p + r| = \left|\frac{2a(1 - abfj)}{1 - a^2 b^2 f^2} + r\right| \quad (7)$$

$$= \sqrt{\left(r + \frac{2a}{1 + a^2 b^2 f^2}\right)^2 + \left(\frac{2a^2 bf}{1 + a^2 b^2 f^2}\right)^2}$$

Equation 7 was used to fit the experimental data of the relationship between the equivalent impedance and the measuring frequency in FIG. 4B. The best-fit values of the fitting parameters were determined to be $a=302.93\Omega$, $b=5.245\times10^{-5}$ F and $r=893.64\Omega$.

Fatigue Testing

Figure 5A:
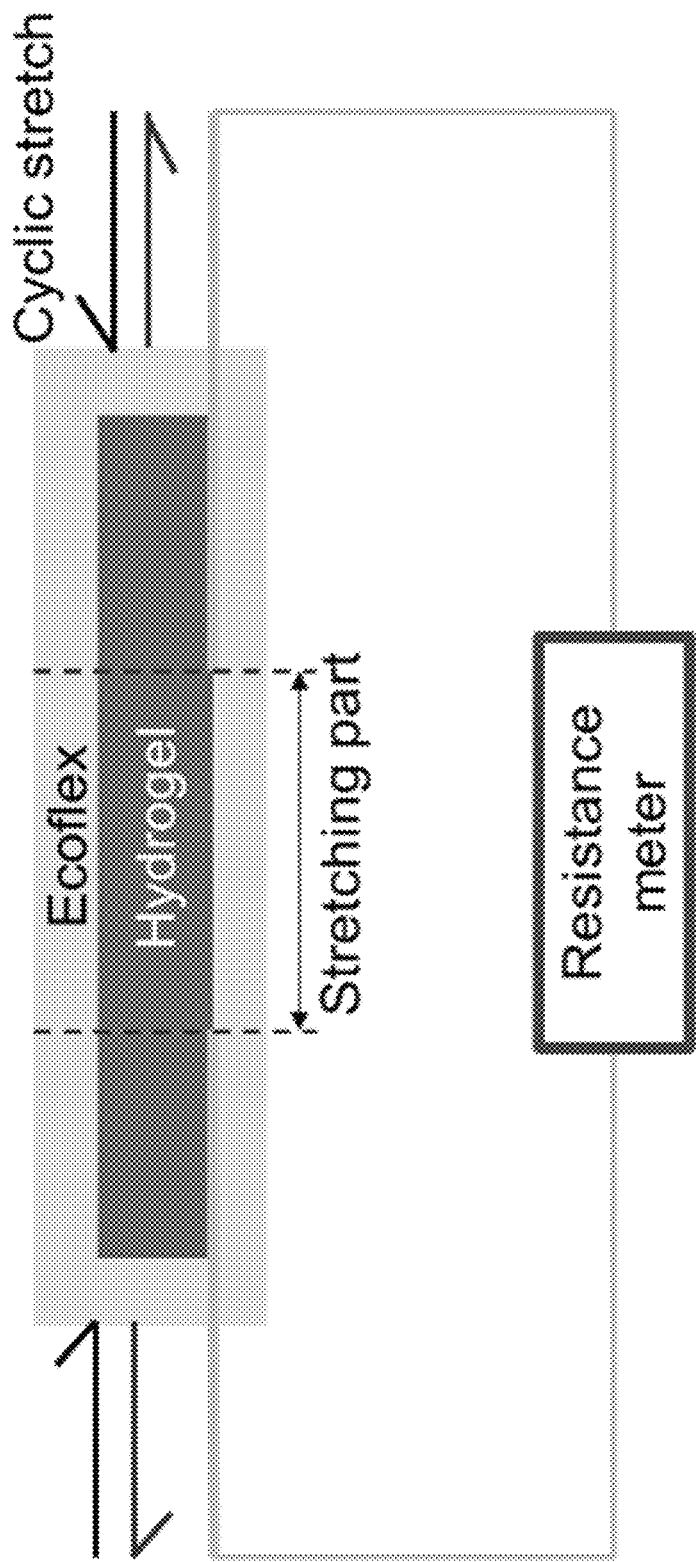
FIG. 5A shows a schematic of the experimental setup for fatigue testing according to one or more embodiments.
Figure 5B:
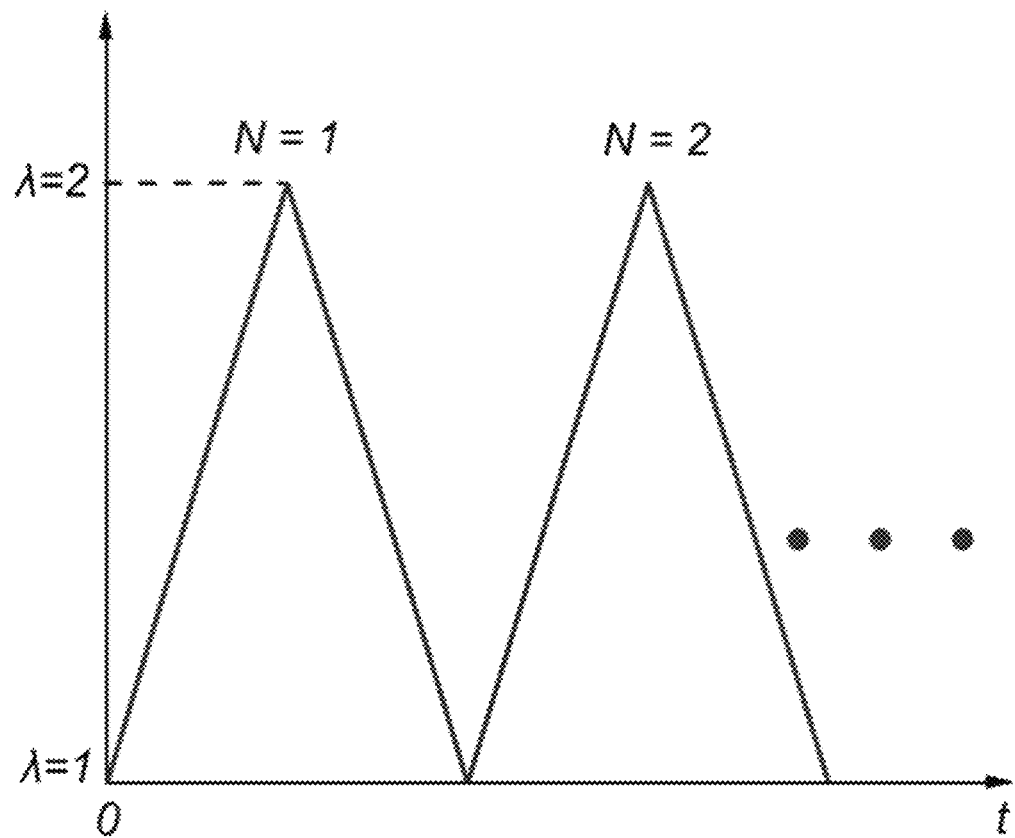
FIG. 5B shows the loading profile of the cyclic test according to one or more embodiments.
Figure 6A:
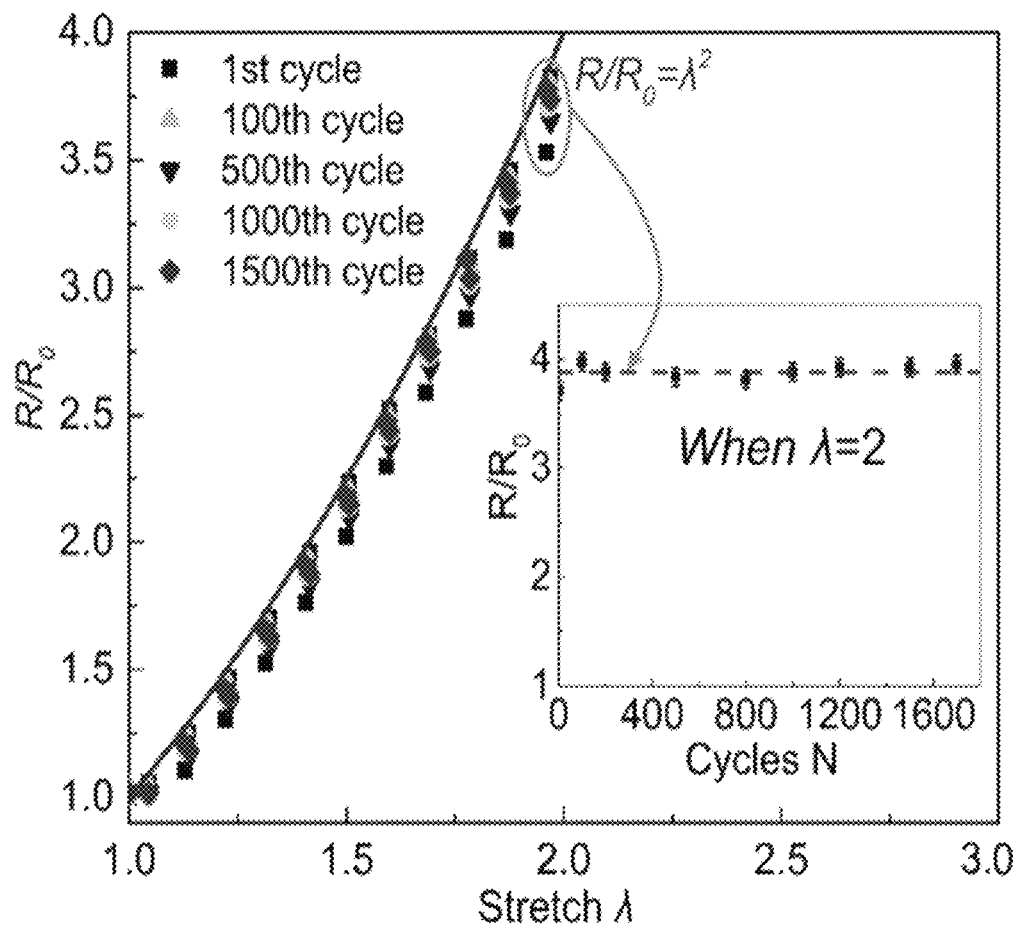
FIG. 6A shows the change of impedance of the sensor as a function of stretch over repeated loading cycles, according to one or more embodiments.
Figure 6B:
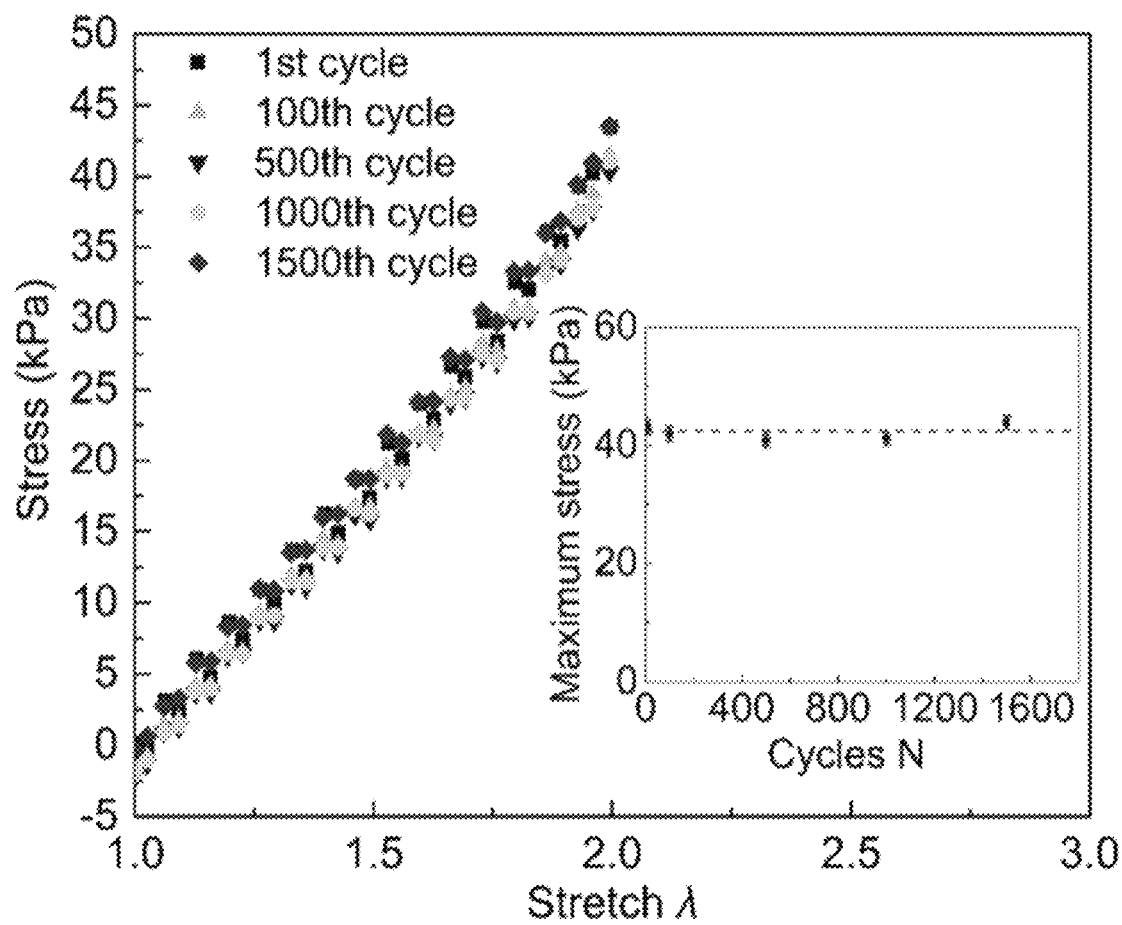
FIG. 6B shows stress-stretch curves of the sensor at different numbers of cycles, according to one or more embodiments.

To examine the sensor performance over long-term use, fatigue tests were performed to determine if the mechanical and electrical properties are stable during repeated operation. In some embodiments, the design of the samples for the fatigue test is shown in FIG. 5A. Cyclic loading and unloading were applied with a maximum stretch of 2 at a strain rate of 0.066 s$^{-1}$ (FIG. 5B). In order to slow down the dehydration process of the hydrogel sensor, an additional layer of elastomer was used to seal the hydrogel, and the two ends were connected to a resistance meter. During the test, the impedance was continuously monitored at a fixed measuring frequency of 10 kHz, and the stress-stretch curves were recorded. As the sensor was subjected to cyclic stretch, the resistance changed accordingly and was captured by the resistance meter. The change of impedance as a function of stretch consistently matched the prediction $R/R_0 \sim \lambda^2$ for more than 1500 loading cycles, indicating high electrical stability (FIG. 6A). The ratio $R/R_0$, where R represents the impedance of the sensor in the deformed state, nearly maintained a constant value of 4 at a stretch of 2. In addition, the stress-stretch curve of the 1500$^{th}$ cycle nearly replicated that of the 1$^{st}$ cycle (FIG. 6B), indicating high mechanical stability. The maximum stress was constant around 40 kPa, and there was no significant hysteresis. Note that the mechanical stability was expected, as the bulk properties of the elastomer in the sensor have been preserved, and the elastomer has been optimized to be highly elastic and fatigue resistant.

Figure 7A:
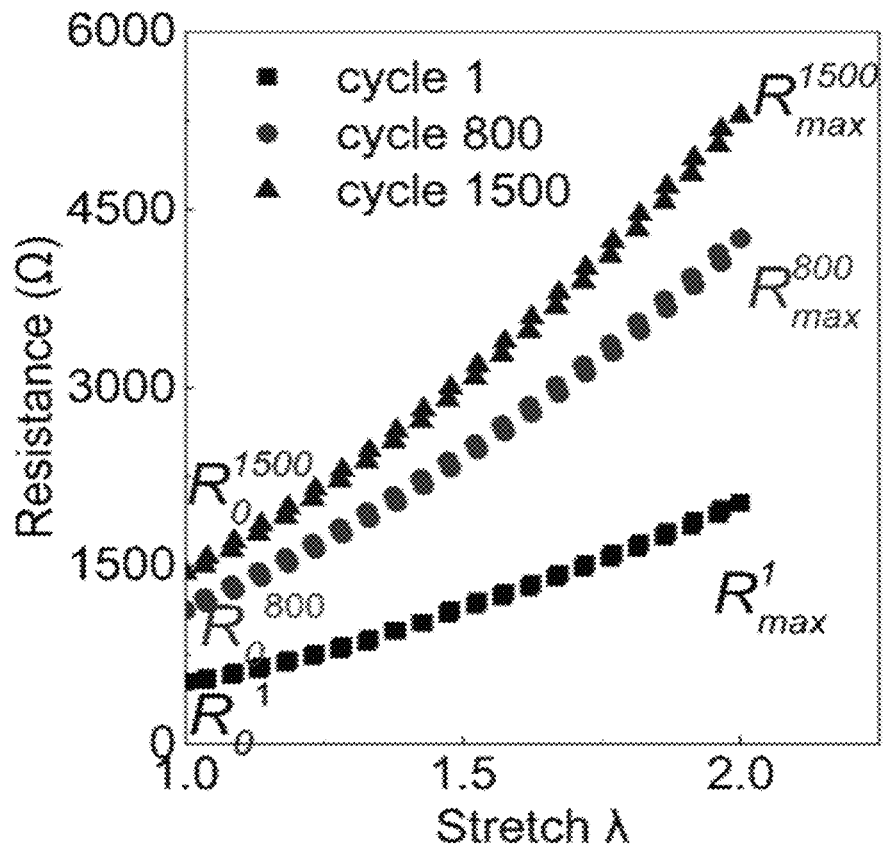
FIG. 7A shows hydrogel resistance changes with stretch according to one or more embodiments.
Figure 7B:
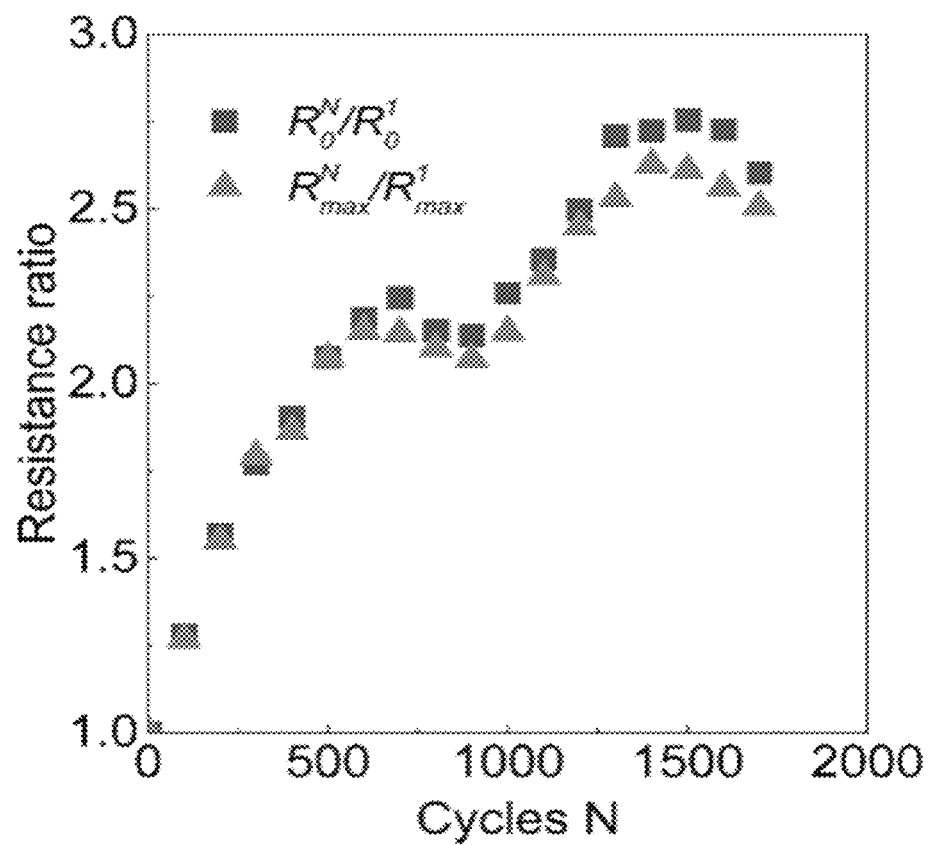
FIG. 7B shows the initial and maximum resistance of the hydrogel fluctuates over cycles, according to one or more embodiments.
Figure 7C:
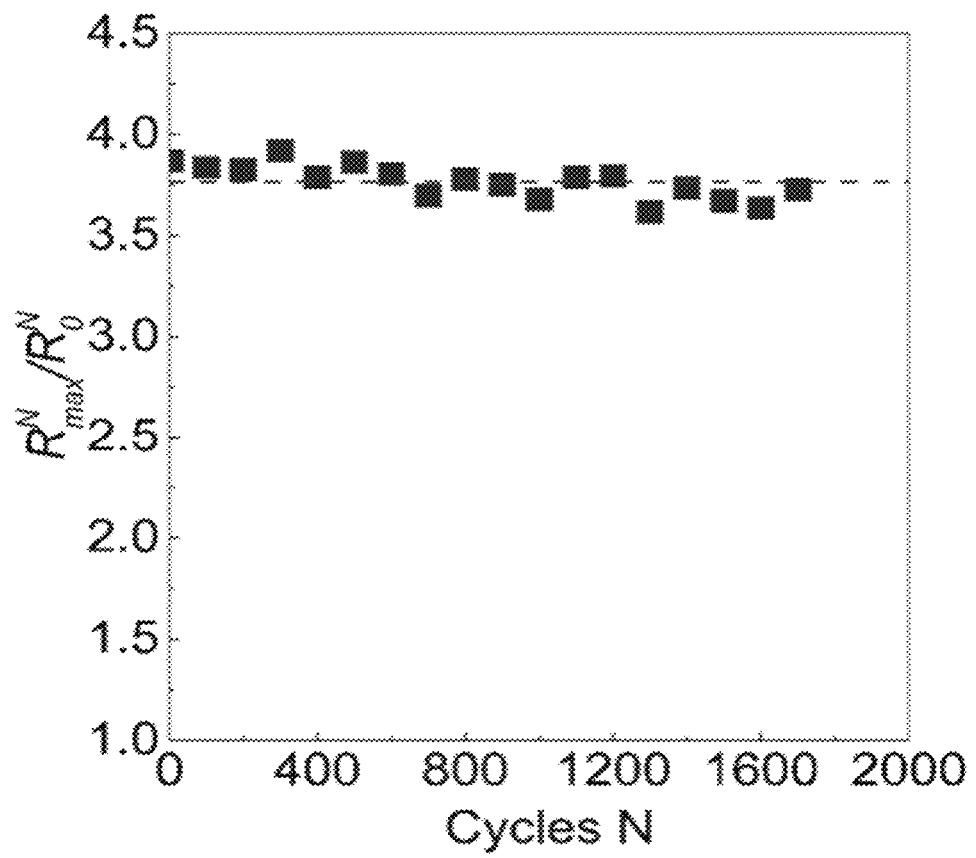
FIG. 7C shows that the ratio of the maximum resistance, $R_{max}$, to $R_0$ at different numbers of cycles remains constant, according to one or more embodiments.
Figure 8A:
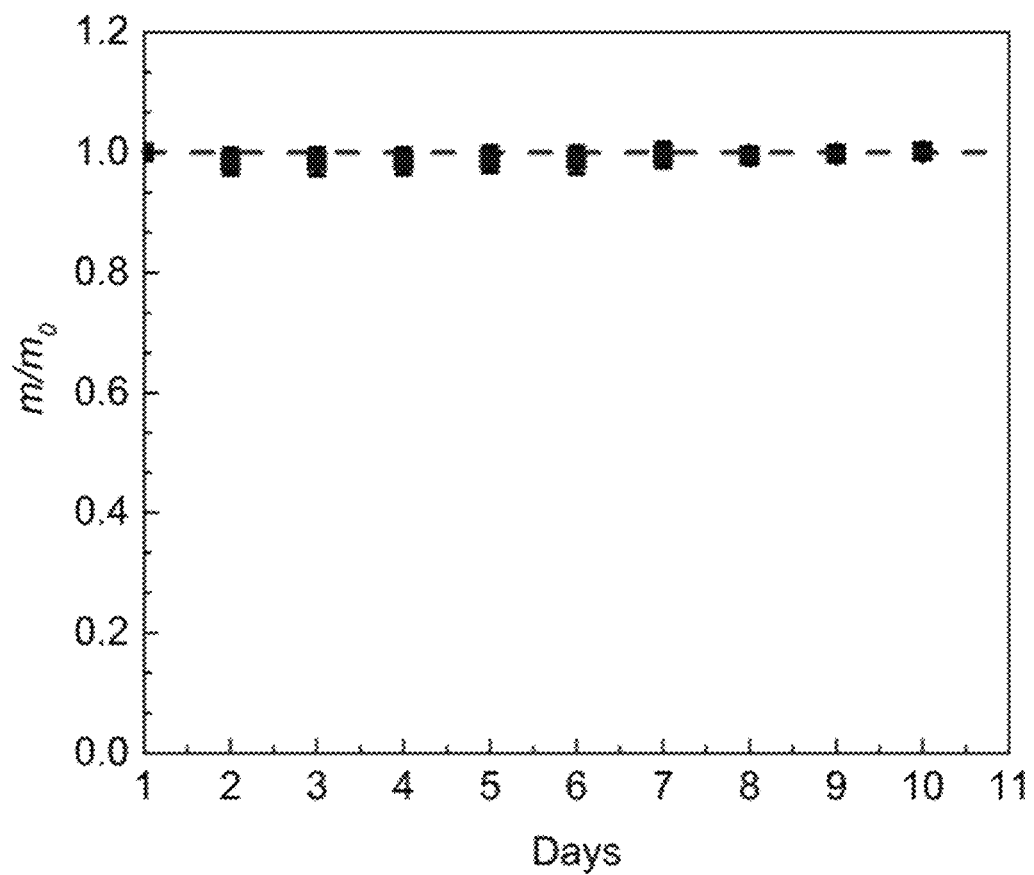
FIG. 8A shows long-term stability of the mass of bare hydrogel sensors according to one or more embodiments.
Figure 8B:
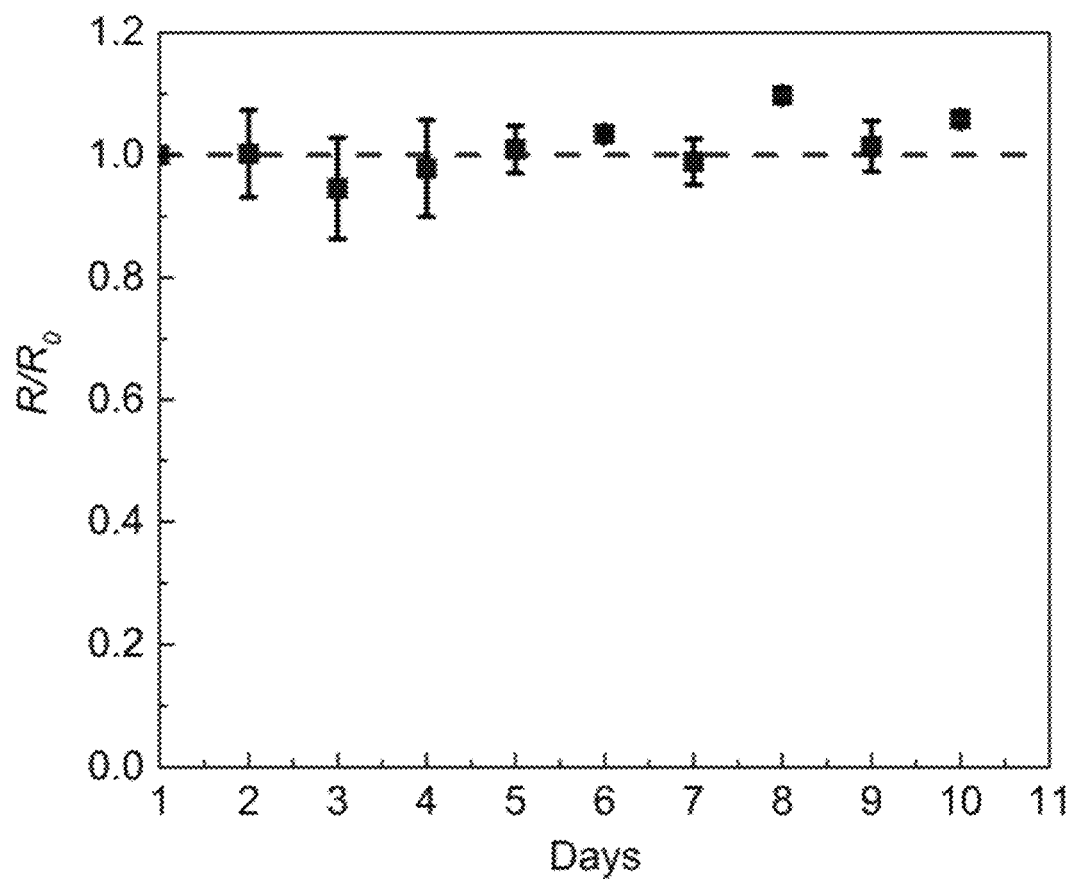
FIG. 8B show long-term stability of the mass of bare hydrogel sensors according to one or more embodiments.

As a comparative experiment, a fatigue test on a hydrogel-elastomer bilayer with no dehydration-resistant coating was also carried out to compare to the results with the coating (FIGS. 7A-7C). The resistance of the hydrogel fluctuated over cyclic loading, resulting in the drift of the resistance-stretch curves (FIGS. 7A-7B). Both $R_0$ and the maximum resistance $R_{max}$ drifted over subsequent cycles. This was due to the fluctuation of the relative humidity in the environment that causes the swelling/de-swelling of the hydrogel. However, in some embodiments, the swelling/de-swelling process of hydrogel relies on diffusion, and it took 0.8 h for the hydrogel to exhibit a 20% change in resistance. For individual cycles with a time scale of 30 s, the change of water content was negligible, and the ratio $R/R_0$ always scaled with $\lambda^2$. In particular, the ratio of the resistance at stretch 2 over the resistance in the original state remained a constant (FIG. 7C). In this embodiment, this result can be explained by the fact that the ratio of $R_{max}/R_0$ is only related to deformation, but not the absolute value of resistance, as the conductivity of the hydrogel is a material property that only depends on water content and ion concentration. In these embodiments, these results demonstrate that sealing the hydrogel with an additional layer of elastomer helps stabilize the electrical performance of sensor, whereas the hydrogel containing lithium chloride by itself does not dry out in the open air. However, for sensors that are not sealed, $R_0$ can still be measured prior to use, and then the constant value of $R/R_0$ can be used to predict the current resistance R. For the unsealed sensor, long-term stability in mass and resistance over 10 days is demonstrated in FIGS. 8A-8B. The samples were exposed in an open environment with temperatures ~20° C. and relative humidity of 20%-40%.

Dynamic Behavior of Sensors

Figure 6C:
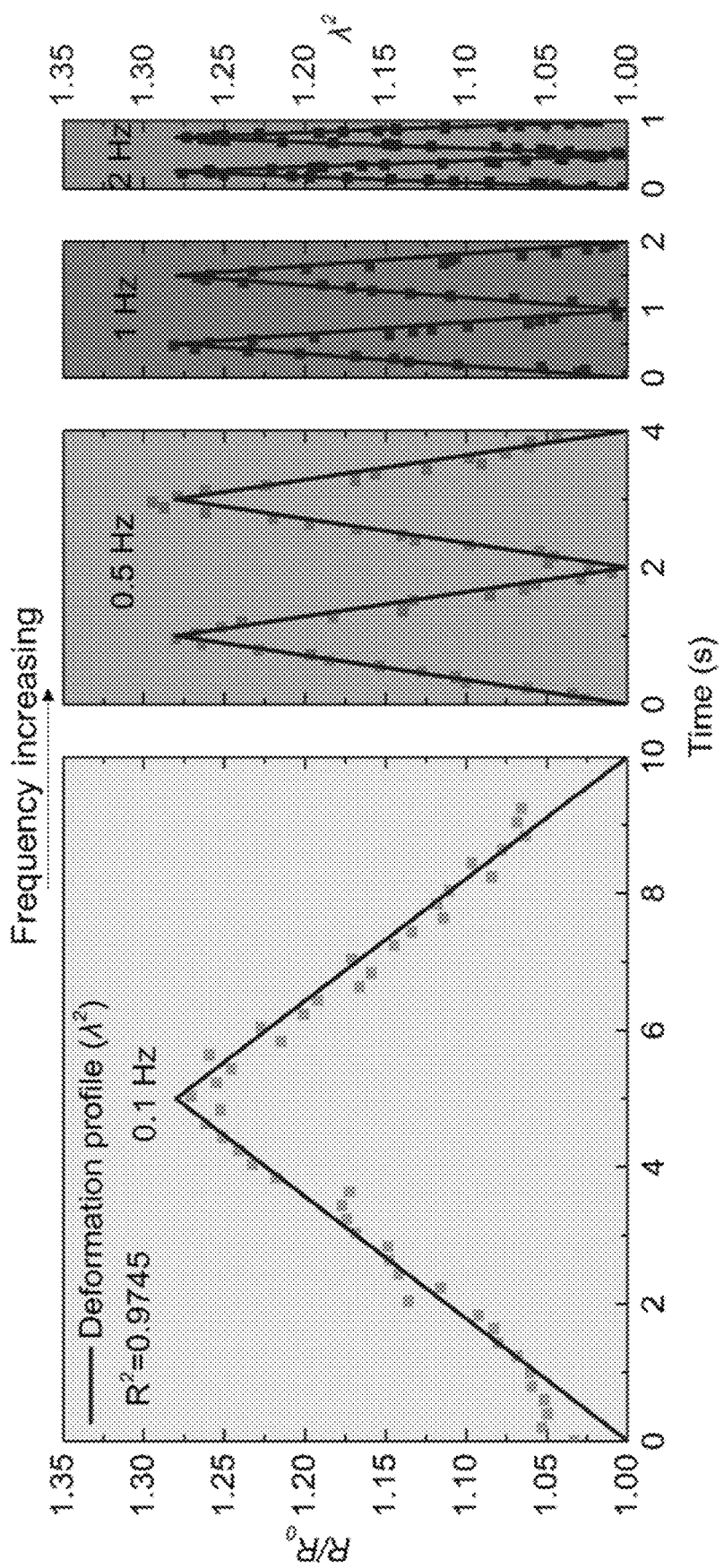
FIG. 6C shows the change of impedance as a function of stretch at various loading frequencies, according to one or more embodiments.
Figure 6D:
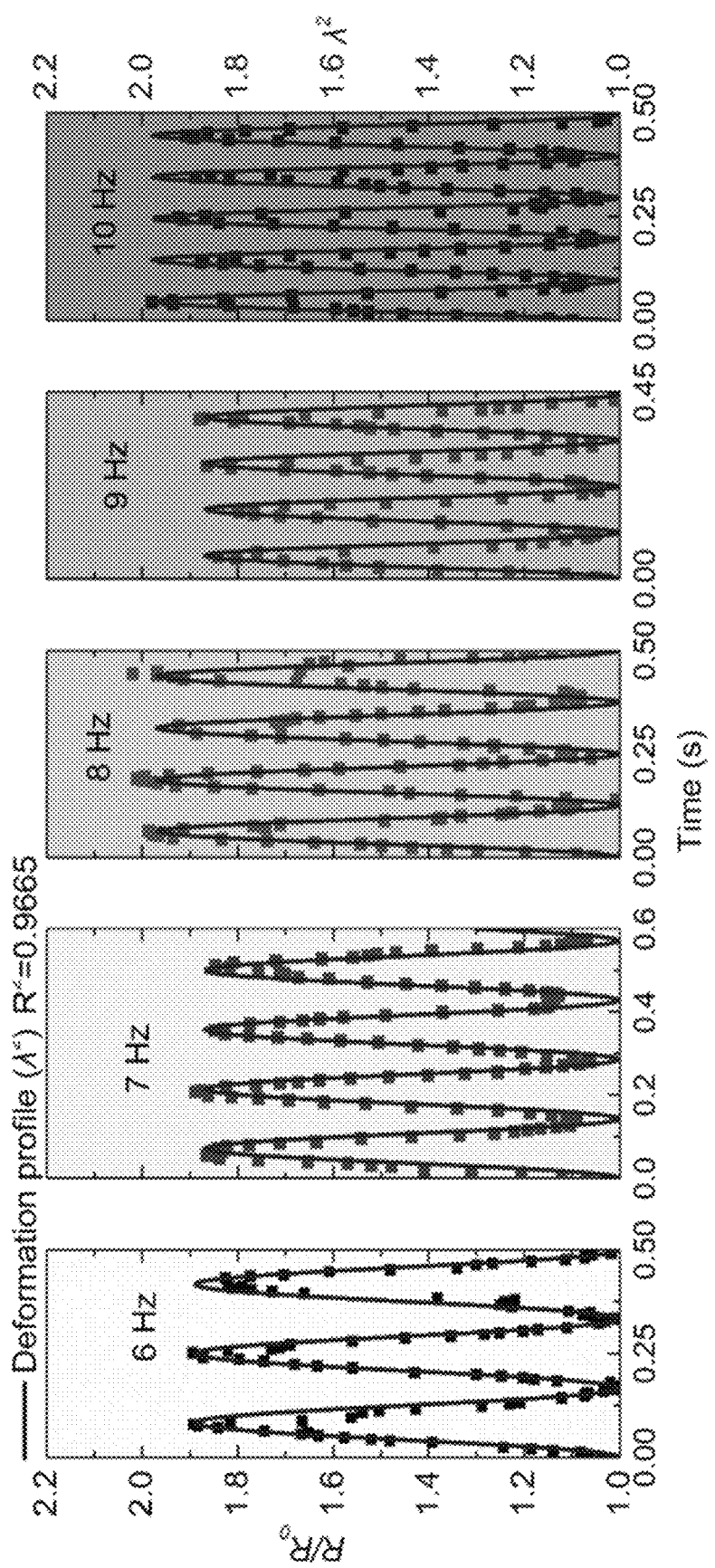
FIG. 6D shows the change of impedance as a function of stretch at various loading frequencies, according to one or more embodiments.

In some embodiments, in order to measure the transient deformation states of soft robots, the hydrogel sensors require a high response rate at relevant mechanical frequencies. In some embodiments, current pneumatically-actuated soft robots typically attain a bandwidth of less than 4 or 5 Hz. For the hydrogel sensing circuit described in these embodiments, theoretically only the RC delay limits the signal transfer time. Here, the RC time constant $\tau$ is $$\tau = RC, \quad (8)$$

where R is the total resistance of the hydrogel sensor and C is the capacitance of EDL. Given a resistance on the order of 10$^3\Omega$ and a capacitance on the order of 10$^{-5}$ F, the RC delay was estimated to be on the order of 10$^{-2}$ s. To experimentally demonstrate that performance, dynamic tests were conducted on the soft sensors at different frequencies using a universal materials testing device (model 5966, Instron, Norwood, MA) at low frequencies and a vibration platform (Hurtle Fitness Vibration Platform Workout Machine, HURVBTR30) at high frequencies. Due to limitations of the testing equipment, the stretch amplitude was not identical on both machines. However, the results at both low frequency (FIG. 6C) and high frequency (FIG. 6D) clearly showed that the synchronization of deformation and measured resistance changed from 0.1 to 10 Hz. As expected, $R/R_0$ was still equal to $\lambda^2$ for each frequency, indicating that the resistivity of the hydrogel sensor was still stable in the high-frequency deformation state. Based on these results, the hydrogel sensor can effectively meet the demands of most current soft robotic applications, and sensor resistance and capacitance can be controlled through geometric design to provide orders-of-magnitude increased bandwidth, if needed.

Large-Strain Sensor for Soft Robots

Figure 9A:
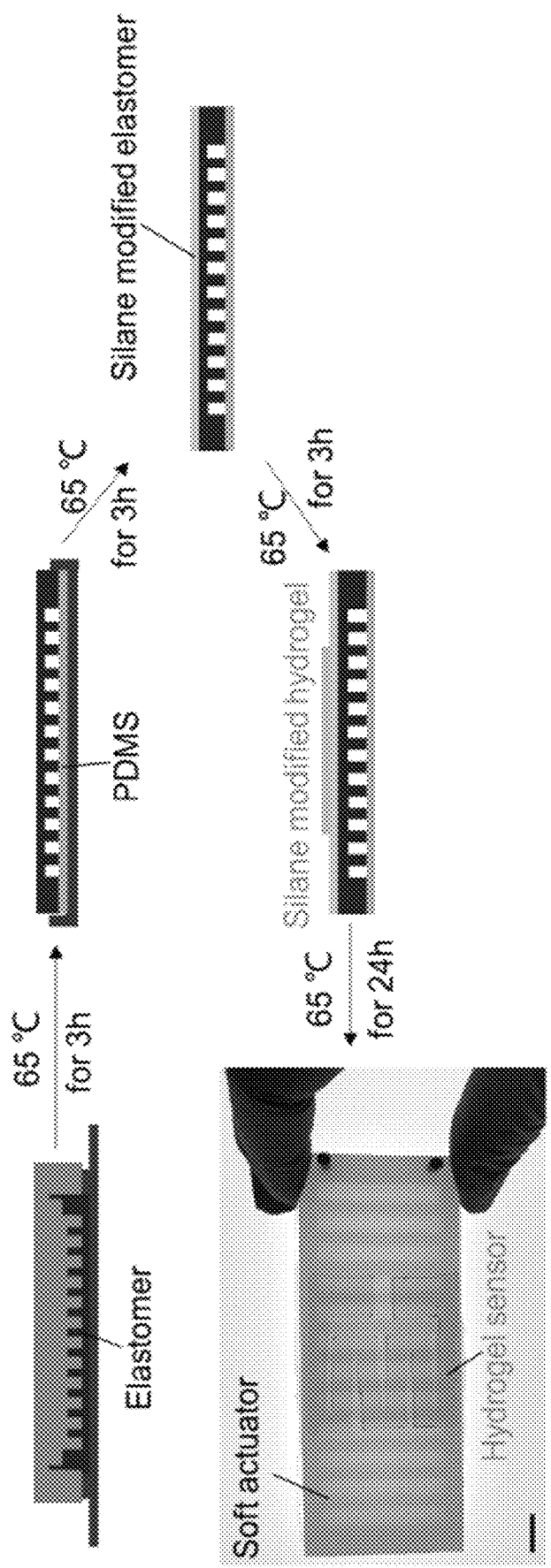
FIG. 9A demonstrates the fabrication process of a soft actuator integrated with a hydrogel-based large-strain sensor, according to one or more embodiments.
Figure 10A:
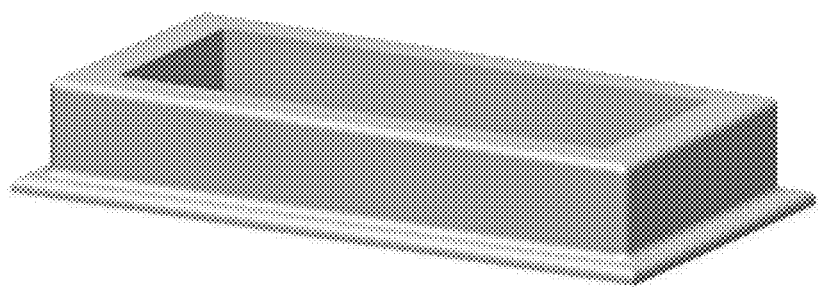
FIG. 10A shows the 3D-printed outer mold of the multi-chambered upper section for casting the pneumatic soft actuator, according to one or more embodiments.
Figure 10B:
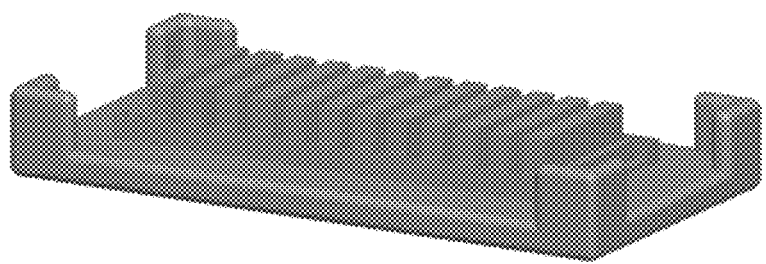
FIG. 10B shows the 3D-printed inner mold of the multi-chambered upper section for casting the pneumatic soft actuator, according to one or more embodiments.
Figure 10C:
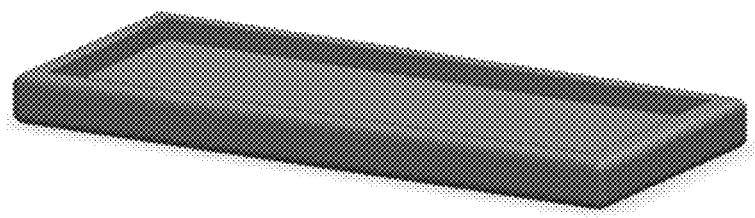
FIG. 10C shows the 3D-printed mold for the strain-limiting base layer for casting the pneumatic soft actuator, according to one or more embodiments.

After characterizing the performance of the hydrogel sensor in several loading conditions, the capabilities of the sensor on a soft pneumatic robot were demonstrated. The manufacturing process consisted of several steps, during which the hydrogel was bonded to the elastomeric actuator via the stick-on strategy (FIG. 9A). A typical silicone rubber elastomer frame was synthesized by molding, followed by sealing the air chambers (white voids) with a strain-limiting layer of stiffer polydimethylsiloxane (PDMS) to form a pneumatic actuator. The outer surface of the actuator is then coated with a thin layer of triethoxyvinylsilane (TEVS)-modified silicone rubber. Finally, a 3-(trimethoxysilyl) propyl methacrylate (TMSPMA)-modified polyacrylamide (PAAm) hydrogel containing 8.0 M lithium chloride is attached and bonded to the TEVS-modified silicone. In the first step, a classic multi-chambered pneumatic soft actuator was fabricated with a compliant upper section and a stiff, strain-limiting base layer. In this case, the upper section consisted of silicone rubber (Dragon Skin® 20, Smooth-On, Inc., Macungie, PA), and the base layer consisted of polydimethylsiloxane (PDMS) (Sylgard 184, Dow Corning, Midland, MI). In some embodiments, the 3D-printed mold for actuator fabrication is shown in FIGS. 10A-10C.

After the soft actuator cured, a thin layer of silane-modified elastomer was cast and cured on the top surface of the upper section. In the second step, a salt-containing silane-modified polyacrylamide (PAAm) hydrogel was bonded to the silane-modified elastomer layer by simply placing it on top of the layer for 24 h at 65° C. In some embodiments, this stick-on strategy decouples the synthesis of the elastomer and hydrogel, facilitating the fabrication process to a large extent: given a cured elastomer and hydrogel, apply a primer on the surface of the elastomer and then stick on the hydrogel. In these embodiments, this method is also generic in that silane chemistry is robust and the approach can be readily applied to numerous elastomers and hydrogels.

Figure 11:
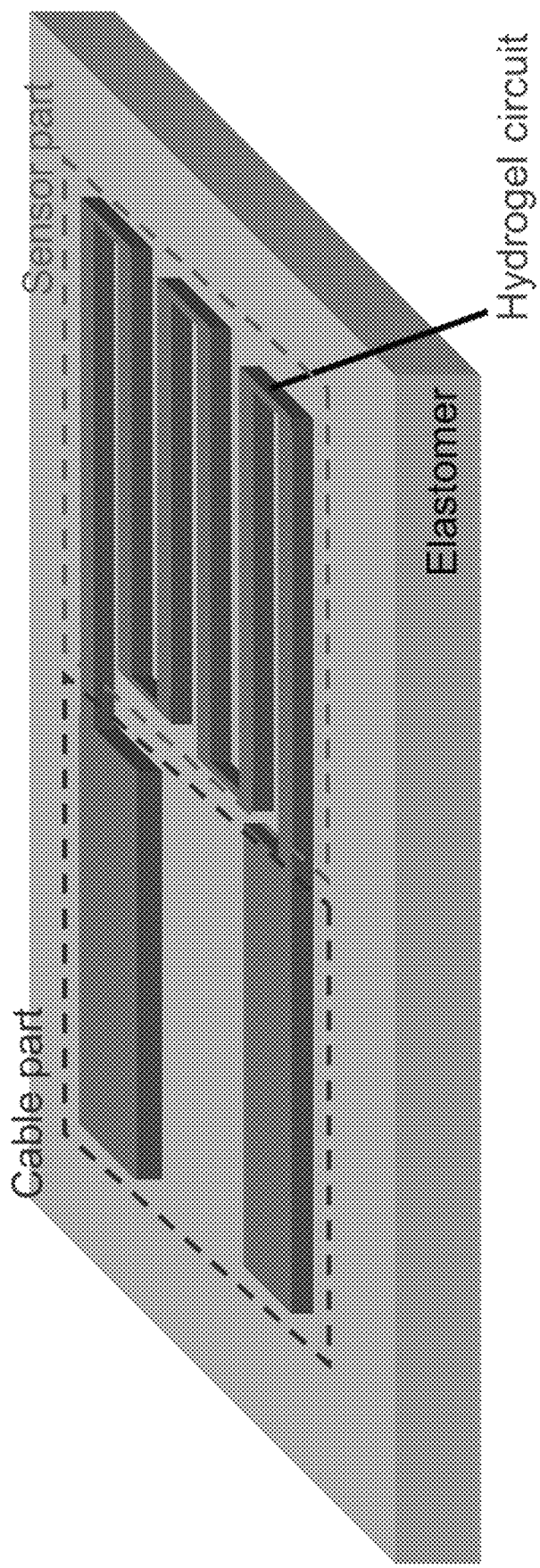
FIG. 11 shows design of a hydrogel circuit for soft robots according to one or more embodiments.

FIG. 11 illustrates that, in some embodiments, hydrogels can not only be used as sensors, but also as soft conductive connections (i.e., ionic cables). In these embodiments, this means that the sensor and its wiring share the benefits of strong adhesion and stick-on fabrication. To integrate the cable and the sensor together on a soft actuator and eliminate significant impedance change in the ionic cable during deformation, the hydrogel was patterned in a specific geometric design (FIG. 11). For the sensor, the hydrogel is cast into a narrow serpentine pattern to increase the resistance $R_{sensing}$. For the ionic cable, the hydrogel is cast into a straight wide line to decrease the resistance $R_{cable}$. The ratio of $R_{cable}/R_{sensing}$ is sufficiently small such that during deformation, the resistance change in $R_{cable}$ is negligible compared to the resistance change in $R_{sensing}$. The lengths of the ionic cable and sensor were denoted as $l_C$, $l_S$ respectively, and the cross-sectional areas as $A_C$, $A_S$ respectively. The length of sensor, $l_S$, was assumed to be 10 times that of the cable, $l_S=10l_C$, and the cross-sectional area of the cable was assumed to be 10 times that of the sensor, $A_C=10A_S$. In addition, the resistivities of the cable and sensor were the same, i.e. $\rho_c=\rho_s$. According to $$R = \rho \frac{l}{A},$$

the relationship of resistance between the cable and sensor was $$R_C = \frac{R_S}{100}.$$

Thus, changes in the resistance of the cable due to deformation were negligible compared to changes in the resistance of the sensor.

Figure 9B:
FIG. 9B shows a sequence of images showing the deformation process of the pneumatic actuator with increasing pressure, according to one or more embodiments.
Figure 9C:
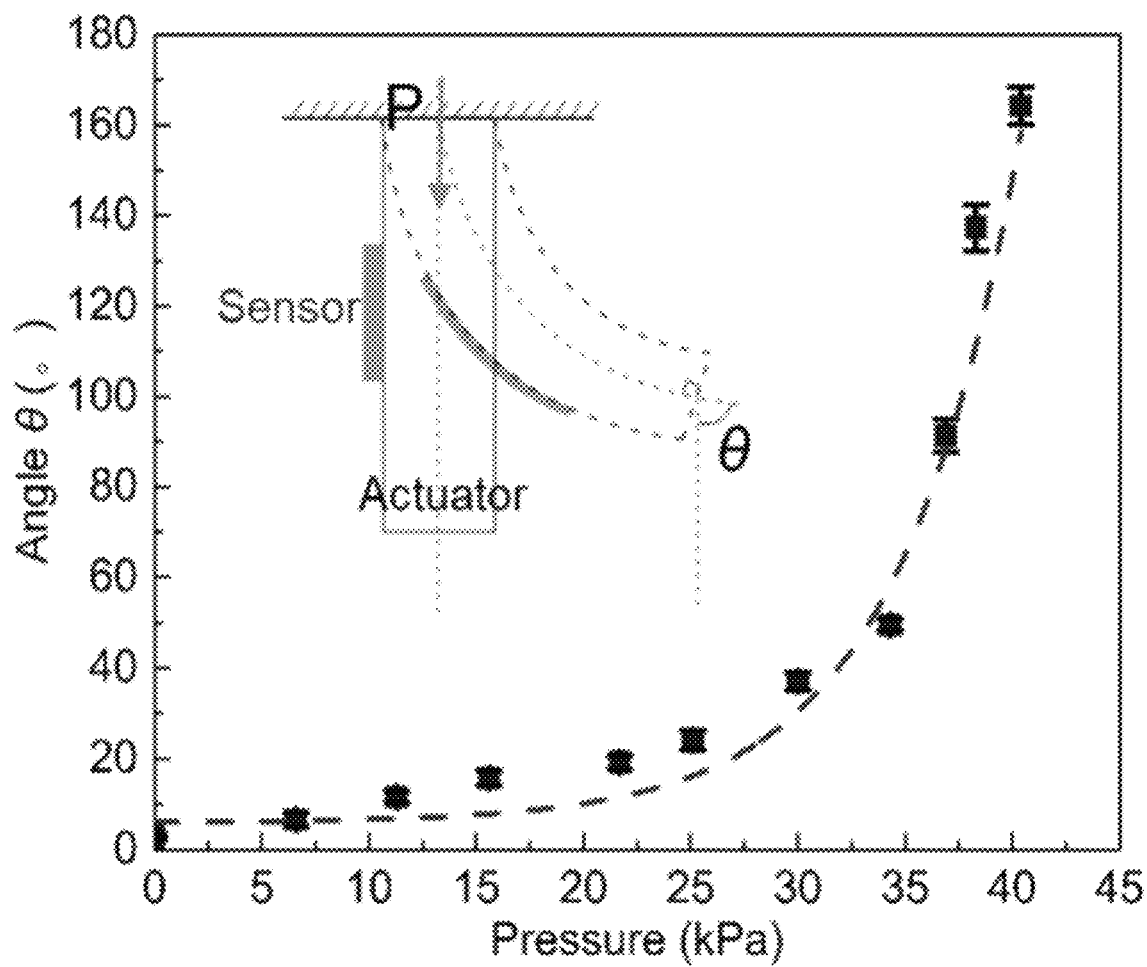
FIG. 9C shows bending angle versus pressure for the large-strain sensor according to one or more embodiments.
Figure 9D:
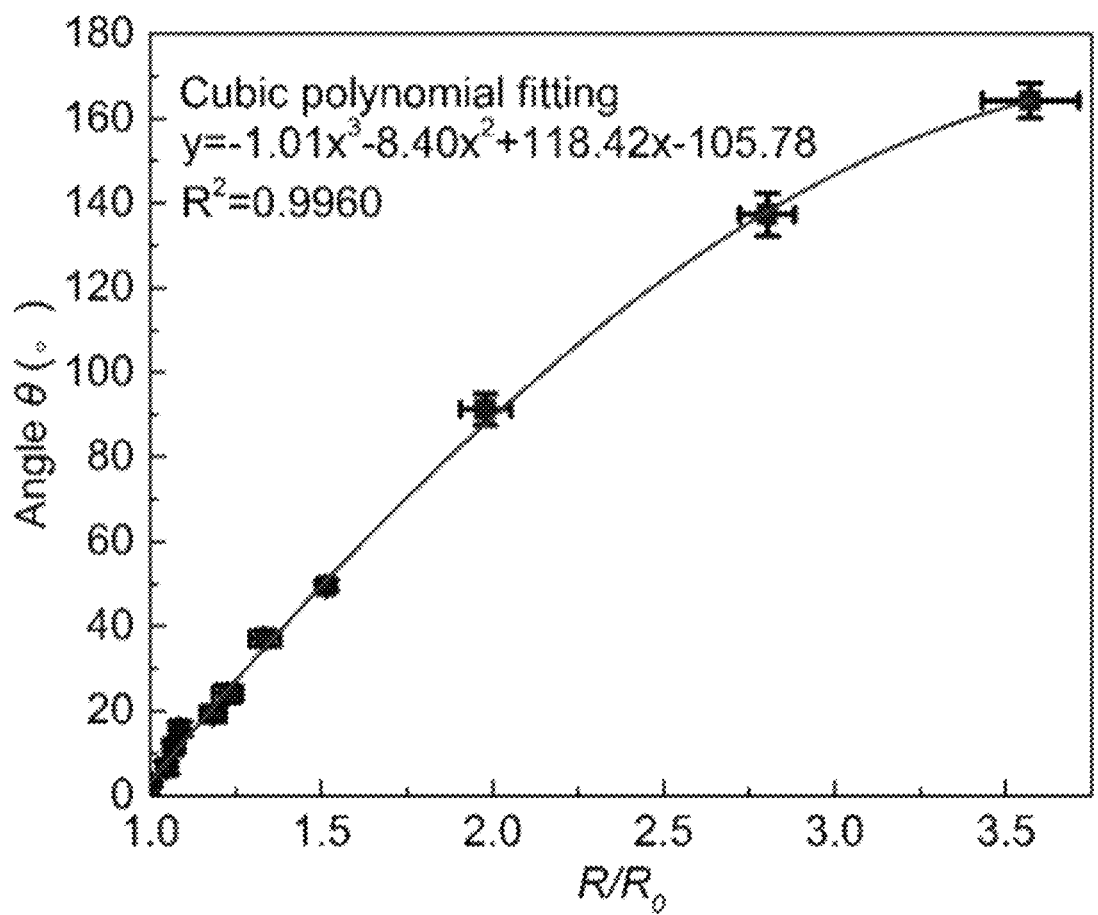
FIG. 9D shows the bending angle as a function of relative resistance change of the large-strain sensor according to one or more embodiments.
Figure 12:
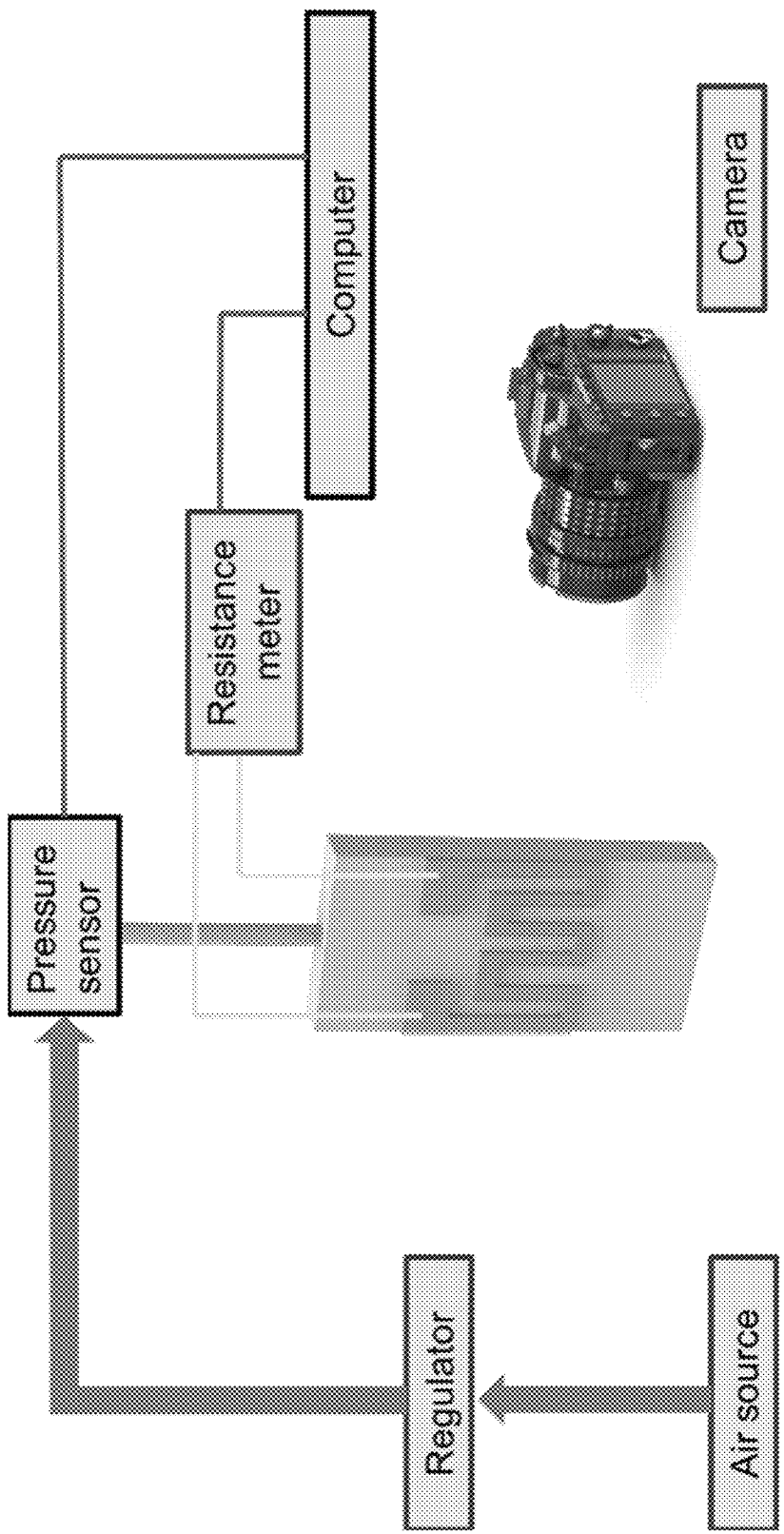
FIG. 12 shows the experimental setup for the characterization of the pneumatic actuator with an integrated hydrogel-based sensor, according to one or more embodiments.
Figure 13:
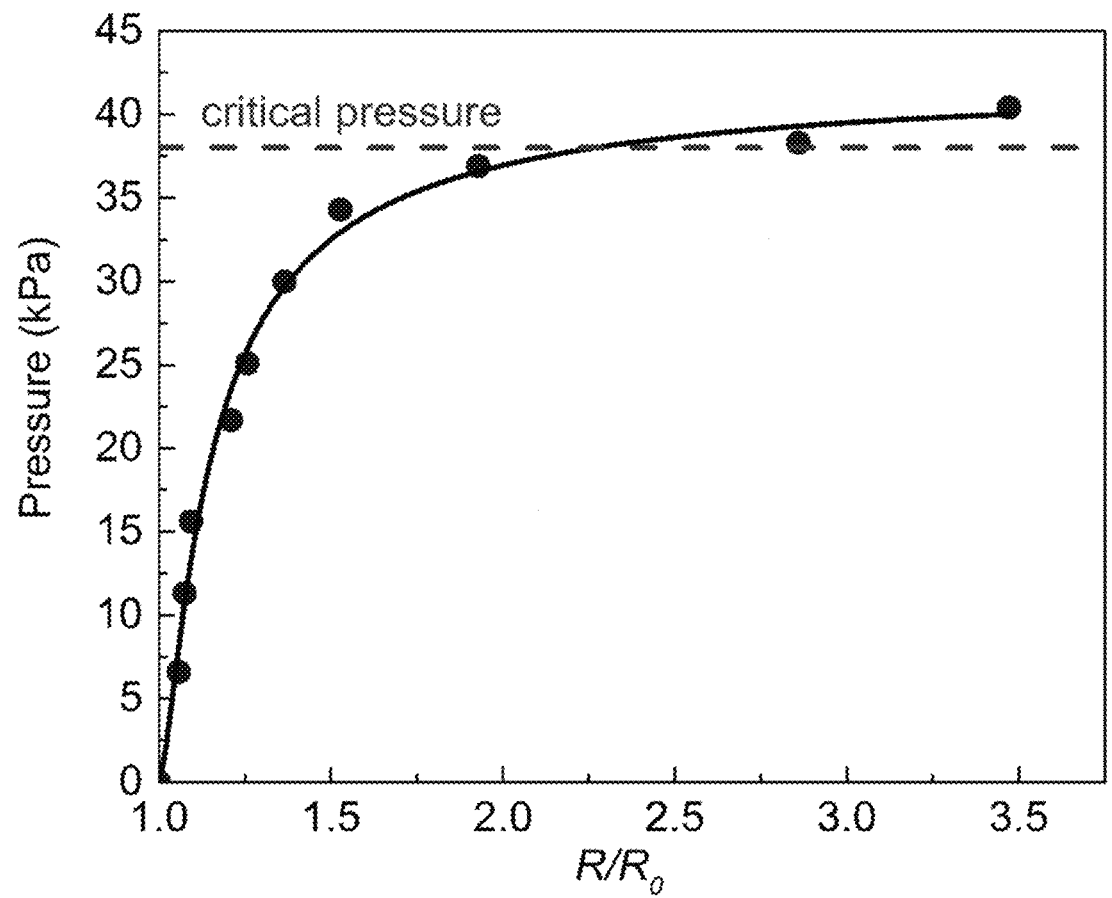
FIG. 13 shows the relationship between pressure in the actuator and the change of resistance of the hydrogel sensor during inflation of the actuator, according to one or more embodiments.
Figure 14:
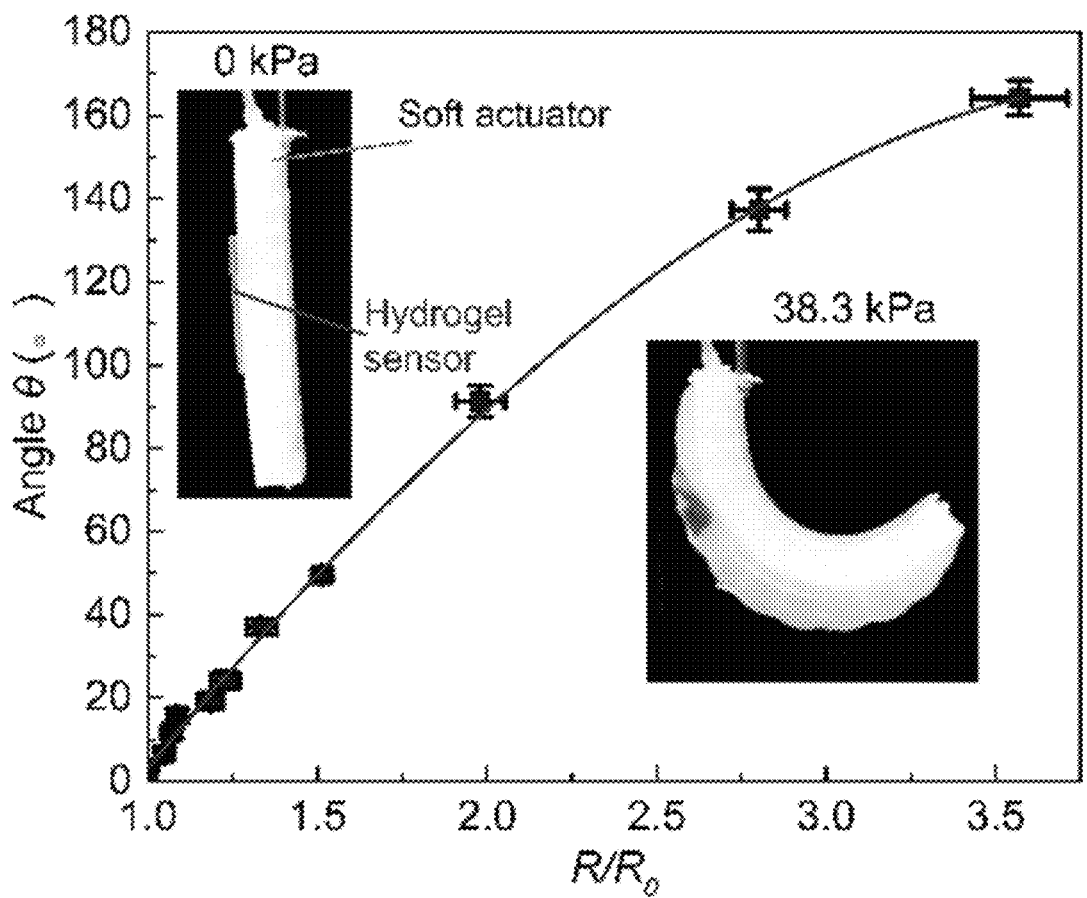
FIG. 14 shows the stick-on large-strain sensor applied to soft robotics according to one or more embodiments.

An experimental apparatus was constructed for the characterization of the sensor-integrated pneumatic actuator (FIG. 12). A regulated air pressure source was used to inflate the actuator, and the pressure in the actuator itself was continuously monitored by a pressure sensor. As the pneumatic actuator was inflated, the hydrogel sensor deformed and changed its resistance accordingly. Resistance variation of the hydrogel sensor was measured by a resistance meter connected to a computer that records the measurements. The deformation process of the actuator was photographed using a digital camera (EOS 70D, Canon, Tokyo, Japan), and the bending angle estimated by image processing. The inflation process was incremental, and at each input pressure, a steady-state was achieved after a certain time period. The relative resistance of hydrogel sensor rose synchronously with the pressure. FIG. 9B shows how the pneumatic actuator deformed as the pressure increased. During the inflation process, the hydrogel sensor deformed freely with the actuator without debonding. The bending angle, θ, defined as the acute angle between the centerline of the actuator and a vertical line intersecting the tip of the actuator, increased with rising pressure; a schematic of the two variables is shown in FIG. 9C. The angle increased slightly at the beginning, and, after a critical point, it rose rapidly with a small pressure increase. In these embodiments, this is similar to inflating a balloon, as the volume keeps increasing while the pressure remains almost constant. This critical pressure was observed to be about 38 kPa (FIG. 13). To predict the bending angle in some embodiments, the relationship between the resistance change and angle can be accurately approximated by a simple cubic polynomial function (FIG. 9D). In these embodiments, this fitting function can be determined by a single calibration step, after which the configuration of the pneumatic actuator can be determined by sensing resistance.

Fabrication of Pneumatic Actuator

The molds were 3D-printed (Objet Connex 500 3D, Stratasys, Eden Prairie, MN, USA), as shown in FIGS. 10A-10C. Then, Dragon Skin®: 20 precursor was cast into the outer mold of the multi-chambered upper section and sealed with the inner mold. After curing, the Dragon Skin® 20 unit was moved to the mold for casting of the strain-limiting polydimethylsiloxane (PDMS) base layer.

Synthesis of Sensing Circuit on Soft Actuator 2.0 M of acrylamide was dissolved for every 1 mL of solution and the following added: 10 µL of acetic acid at 0.1 M, 4 µL of N,N'-methylenebisacrylamide (MBAA) at 0.1 M, 1.9 µL of 3-(trimethoxysilyl) propyl methacrylate (TMSPMA) and 1 µL of Iragcure2959 at 0.1 M in ethyl alcohol. The solution was stirred for 1 minute and degassed. Then, the solution was poured into a mold with a specific geometric design and cured under UV for 30 minutes. After curing, the hydrogel was immersed in 8.0 M LiCl aqueous solution for half an hour to allow ions to fully diffuse into the hydrogel and reach the same concentration as in the solution. Next, the hydrogel was placed onto a soft actuator with a silane-modified surface. The entire structure was cured at 65° C. for 24 hours to achieve stable adhesion between the hydrogel and elastomer.

Characterization of Soft Sensors

For the quasi-static, dynamic and fatigue testing, as well as characterization of the soft robot, a stretchable silver fabric (Shieldex® Medtex P130, V Technical Textile Inc., Palmyra, NY) was used to connect to the hydrogel. A waveform generator (Keysight 33512B, Keysight Technologies, Santa Rosa, CA) applied a sinusoidal voltage. The amplitude of the voltage was restricted to 1 V. An oscilloscope (Keysight DSO1004A, Keysight Technologies, Santa Rosa, CA) was used to measure the voltage across the fixed resistor that is in series with the hydrogel sensor. In the fatigue test, a resistance meter (BK Precision Model 879B, B&K Precision Corporation, Yorba Linda, CA) connected to a computer was used to measure the impedance of the sensor. For the bandwidth test at different mechanical frequencies, a dynamic test was conducted using a universal materials testing machine (Instron Model 5966, Instron, Norwood, MA) and a vibration platform (Hurtle Fitness Vibration Platform Workout Machine HURVBTR30). For pressure control and sensing, a pressure regulator (Type 90, Control Air Inc., Amherst, NH) and pressure sensor (Vernier PS400-BTA, Vernier Software & Technology, Beaverton, OR) were used.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

The invention claimed is:

1. A composite material comprising:
a first material comprising a plurality of crosslinked first polymer chains comprising a plurality of first polymer monomeric units;
a coating layer on at least a portion of the surface of the first material, wherein the coating layer comprises a plurality of adhesion polymer chains, wherein said plurality of adhesion polymer chains comprises a plurality of the first polymer monomeric units and a plurality of first bond-forming units, wherein the adhesion polymer chains are interwoven with the crosslinked first polymer chains; and
a second material comprising a plurality of second polymer chains on at least a surface of the second material, wherein the coating layer is disposed in-between the first material and the second material and contacting the surface of the first material and the second material, and at least a portion of each of the second polymer chains comprises a plurality of second polymer monomeric units and second bond-forming units;
wherein the first bond-forming units and the second bond-forming units form one or more bonds;
wherein the first material comprises an elastomer and a soft robot or a portion thereof;
wherein the second material comprises a hydrogel; and
wherein the one or more bonds formed between the first bond-forming units and the second bond-forming units comprise siloxane bonds.

2. The composite material of claim 1, wherein the first polymer monomeric units and the second polymer monomeric units are each independently selected from the group consisting of the monomeric units of poly(hydroxyethylmethacrylate) (PHEMA), poly(acrylamide) (PAAM), poly(dimethylacrylamide) (PDMA), poly(N-isopropylacrylamide) (PNIPAM), sodium polyacrylate (NaPAA), poly(acrylic acid) (PAAc), poly(lactic-co-glycolic acid) (PLGA), poly(ethylene glycol) (PEG), poly(ethylene glycol) diacrylate (PEGDA), poly(ethylene glycol) methacrylate (PEGMA), poly(ethylene glycol) dimethacrylate (PEGDMA), poly(vinylidene fluoride) (PVDF), poly(vinylidene fluoride-co-hexafluoropropylene) (PVDF-co-HFP), poly(methyl methacrylate) (PMMA), cellulose, alginate, chitosan, and a combination thereof.

3. The composite material of claim 1, wherein the first polymer monomeric units and the second polymer monomeric units are each independently selected from the group consisting of the monomeric units of styrene butadiene rubber, polybutadiene rubber, silicone rubber, polyurethane, and a combination thereof.

4. The composite material of claim 1, wherein the second material comprises:
a sensor attached on the soft robot or a portion thereof,
a portion of a sensor attached on the soft robot or a portion thereof,
a conductive cable attached on the soft robot or a portion thereof, or
a wire attached on the soft robot or a portion thereof.

5. The composite material of claim 4, wherein the sensor is selected from the group consisting of strain sensor, force sensor, light sensor, temperature sensor, humidity sensor, and a combination thereof.

6. The composite material of claim 4, wherein the sensor is resistive or capacitive.

7. The composite material of claim 1, wherein the first bond-forming units and the second bond-forming units each comprises a molecular moiety comprising a silicon atom linked to a functional group selected from a group consisting of OH, Cl, Br, I, OPh, ester, and sulfonate ester.

8. The composite material of claim 7, wherein the first bond-forming units and the second bond-forming units are 3-(trimethoxysilyl) propyl methacrylate.

* * * * *